United States Patent
Bellamkonda et al.

(10) Patent No.: US 11,395,307 B1
(45) Date of Patent: Jul. 19, 2022

(54) SYSTEMS AND METHODS FOR INTERFERENCE MANAGEMENT IN A RADIO ACCESS NETWORK

(71) Applicant: Verizon Patent and Licensing Inc., Basking Ridge, NJ (US)

(72) Inventors: Krishna K. Bellamkonda, Flower Mound, TX (US); Nischal Patel, Hillsborough, NJ (US); John Cooke, Algonquin, IL (US); Frank Jager, Chester, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 35 days.

(21) Appl. No.: 17/138,483

(22) Filed: Dec. 30, 2020

(51) Int. Cl.
*H04W 88/06* (2009.01)
*H04W 72/08* (2009.01)
*H04W 24/10* (2009.01)
*H04W 24/02* (2009.01)

(52) U.S. Cl.
CPC ......... *H04W 72/082* (2013.01); *H04W 24/02* (2013.01); *H04W 24/10* (2013.01); *H04W 88/06* (2013.01)

(58) Field of Classification Search
CPC ... H04W 72/082; H04W 24/02; H04W 24/10; H04W 88/06
See application file for complete search history.

(56) References Cited

U.S. PATENT DOCUMENTS

| | | | |
|---|---|---|---|
| 9,635,566 B2 * | 4/2017 | Cui | H04W 48/16 |
| 10,341,912 B2 * | 7/2019 | Cui | H04W 24/02 |
| 2010/0105406 A1 * | 4/2010 | Luo | H04W 16/02 |
| | | | 455/452.2 |
| 2013/0201842 A1 * | 8/2013 | Chou | H04W 24/02 |
| | | | 370/252 |
| 2013/0272170 A1 * | 10/2013 | Chatterjee | H04W 74/0808 |
| | | | 370/280 |
| 2017/0223586 A1 * | 8/2017 | Cui | H04W 36/00835 |
| 2021/0122398 A1 * | 4/2021 | Kim | H04W 4/46 |

* cited by examiner

*Primary Examiner* — Julio R Perez

(57) ABSTRACT

A system described herein may provide for the use of artificial intelligence/machine learning ("AI/MIL") techniques to generate models for various locations or regions (e.g., sectors) associated with one or more radio access networks ("RANs") of a wireless network. The system may further use AI/ML techniques to generate interference models to reflect types and/or amounts of radio frequency ("RF") interference measured within the RAN. The system may further determine, based on received RF metrics for a given sector, a particular interference model associated with the sector. Based on a sector model associated with the sector and the determined interference model, one or more actions may be determined in order to remediate any potential interference associated with the sector or surrounding sectors.

20 Claims, 16 Drawing Sheets

SYSTEMS AND METHODS FOR INTERFERENCE MANAGEMENT IN A RADIO ACCESS NETWORK

BACKGROUND

Wireless networks, such as Long-Term Evolution ("LTE") networks, Fifth Generation ("5G") networks, or the like, may include radio access networks ("RANs"), via which user equipment ("UE"), such as mobile telephones or other wireless communication devices, may receive wireless service. Diverse geographical regions of a RAN may be served by different sets of infrastructure hardware, which may cause interference within the RAN in some scenarios.

DETAILED DESCRIPTION OF EXAMPLE EMBODIMENTS

Figure 1:
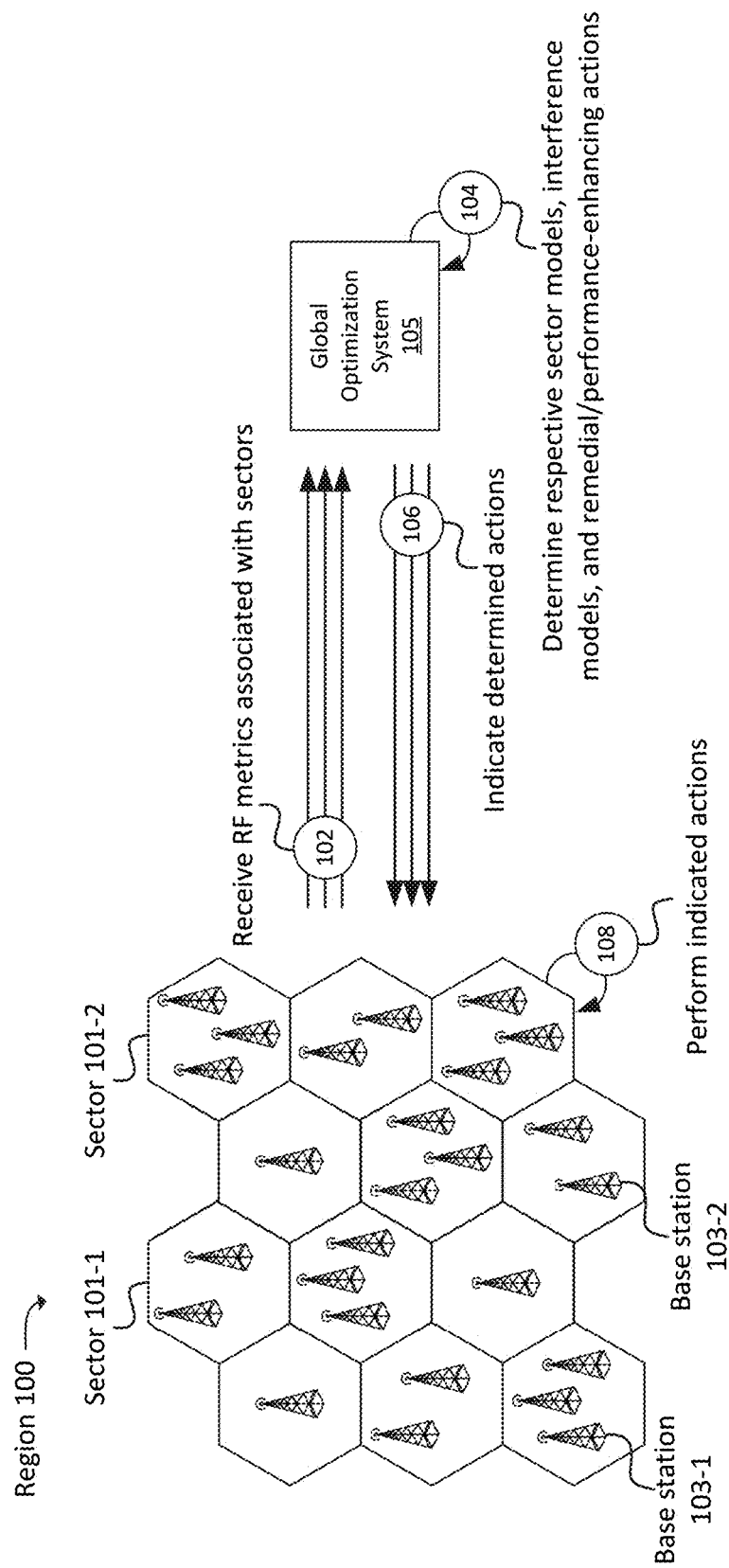
FIG. 1 illustrates an example overview of one or more embodiments described herein.

The following detailed description refers to the accompanying drawings. The same reference numbers in different drawings may identify the same or similar elements. Embodiments described herein provide for the use of artificial intelligence/machine learning ("AI/ML") techniques or other suitable techniques to model attributes, characteristics, key performance indicators ("KPIs"), and/or other information associated with various locations or regions associated with one or more RANs of a wireless network (e.g., a LTE network, a 5G network, and/or another type of network). As discussed herein, such locations or regions may be referred to as "sectors." Further, in the examples discussed herein, sectors may include evenly distributed areas of a uniform shape (e.g., a hexagon). In practice, sectors may be arranged or defined differently. For example, in some embodiments, sectors may be defined with respect to the location of one or more base stations of a RAN (e.g., where a sector may be defined based on a coverage area of the one or more base stations and/or may be defined based on a physical location at which one or more antennas or other physical equipment of the base stations are installed), and/or may be defined independently of the location of the one or more base stations.

Embodiments described herein further provide for the use of AI/ML techniques or other suitable techniques to determine measures of radio frequency ("RF") channel quality, interference, and/or other attributes of particular sectors, as well as the determination of suitable remedial and/or performance-enhancing actions (referred to sometimes herein simply as "actions") to perform to enhance RF channel quality, reduce interference, and/or otherwise enhance operation of the RAN. Some embodiments may select or perform actions (or sets of actions) based on particular characteristics (e.g., which may be reflected by sector models) of particular sectors. Thus, as discussed below, different actions may be performed for sectors that experience similar types of interference, but which are associated with different sector models.

Interference and/or degraded RF channel quality may be caused by, for example, multiple network infrastructure devices, such as base stations, operating in relatively close proximity. Signals may "collide," such as signals that are output by such base station on the same frequency and/or time domain. For example, multiple base stations may broadcast, or otherwise output, reference signals on a control channel (e.g., a Physical Downlink Control Channel ("PDCCH"), a Physical Downlink Shared Channel ("PDSCH"), or the like). The reference signals may include timing information, frequency information, cell identifier information, and/or other suitable information based on which a UE may detect the presence of, and/or connect to, a given base station. In some embodiments, the reference signals may include a Demodulation Reference Signal ("DMRS"), a Phase Tracking Reference Signal ("PTRS"), a Sounding Reference Signal ("SRS"), a Channel State Information Reference Signal ("CSI-RS"), a pilot signal, and/or some other suitable type of reference signal.

In some scenarios, the reference signals may be output at a higher power than "user plane" data (e.g., voice call traffic, data traffic, or the like, wirelessly sent to UEs from base stations). As such, scenarios may arise where "control plane" traffic (e.g., reference signals) from multiple base stations may collide, thus resulting in the detection of interference at a UE that receives or detects the control plane traffic from multiple base stations. Additionally, or alternatively, control plane traffic from one base station may interfere with user plane traffic from another base station. As another example, interference may be caused by "unknown" interference sources, such as RF-emitting devices not necessarily owned and/or operated by a same entity as an owner and/or operator of the RAN. Such RF-emitting devices may include drones, weather measurement devices, and/or other types of devices that emit RF signals and/or otherwise cause RF interference.

Since embodiments described herein include the determination and performance of actions in a dynamic manner that is based on the particular characteristics of sectors at which interference is detected, the levels of interference in the RAN may be reduced, therefore enhancing the user experience of users using UEs that receive wireless service from the RAN, as well as enhancing the overall operation of the RAN itself. Further, as described herein, the association between particular sector models, interference models, and/or associated actions may be generated and/or refined using one or more AI/ML techniques or other suitable techniques (e.g., deep learning, reinforced or unreinforced machine learning, neural networks, K-means clustering, regression analysis, and/or other suitable techniques). In this manner, the particular characteristics of a sector may be taken into account when selecting actions to perform in order to enhance the performance (e.g., increased RF channel quality, reduced interference, etc.) of a RAN, while reducing or eliminating the need for manual intervention in order to determine or implement such actions.

As shown in FIG. 1, for example, geographical area (or region) 100 may be subdivided into a set of sectors 101. The set of sectors 101 may include, as shown, sector 101-1, 101-2, and one or more additional sectors that are not explicitly illustrated with a reference numeral. Further in this example, each sector 101 may be associated with discrete network infrastructure elements, such as particular base stations 103. For example, base station 103-1 may be located in one particular sector 101, while base station 103-2 may be located in another sector 101. Further, additional base stations 103 (e.g., base stations not explicitly illustrated with a reference numeral) may be present in geographical region 100. That is, the location of each base station 103 may be within a particular geographical area (e.g., a hexagonal-shaped geographical area, in this example) that corresponds to a respective sector 101. For the sake of example, each sector 101 is associated with at least one base station 103. In practice, one or more sectors 101 may not include any base stations 103.

As shown, Global Optimization System ("GOS") 105 may receive (at 102) RF metrics associated with one or more sectors 101. The RF metrics may include, for example, measures of signal quality, signal strength, interference, or the like, at given sectors 101 and/or locations within sectors 101. Such measures may include and/or may be based on, for example, Received Signal Strength Indicator ("RSSI") values, Reference Signal Receive Power ("RSRP") values, Signal-to-Interference-and-Noise-Ratio ("SINR") values, Channel Quality Indicator ("CQI") values, or the like.

In some embodiments, such measures may be included in, and/or derived from, measurement reports received from UEs located within sectors 101. For example, a particular measurement report from a given UE may indicate that the UE detected RF signals, according to a particular set of frequencies, from a first base station 103-1, and further that the UE detected RF signals, according to the same set of frequencies, from a second base station 103-2. In this scenario, the detection of RF signals according to the same set of frequencies from two different base station (i.e., base station 103-1 and 103-2) may indicate RF interference at a geographical location of the UE, arising from signals output by base stations 103-1 and 103-2.

As another example, the measurement report from a given UE may indicate a relatively low RSSI value, RSRP value, etc. associated with signals from a given base station 103. Such values may be "relatively" low in that such values may be below a threshold value, and/or may be lower than an expected value (e.g., which may be determined based on a historical analysis of RF metrics). Further, such analysis may be performed based on location, where a first threshold value may be used at a first location (e.g., relatively close to base station 103), while a second threshold value may be used at a second location (e.g., farther away from base station 103).

In some embodiments, and as further discussed below with respect to FIG. 3, GOS 105 may further receive and/or maintain attribute and/or characteristic information for one or more sectors 101. Briefly, such attribute and/or characteristic information may include configuration parameters (e.g., beamforming configuration parameters, RF transmission power parameters, Multiple-Input Multiple-Output ("MIMO") configuration parameters, or the like), physical network infrastructure parameters (e.g., antenna height, antenna location, etc.), locale features (e.g., building density, topographical information, or the like), and/or other types of information associated with respective sectors 101 and/or network infrastructure associated with respective sectors 101 (e.g., network infrastructure located within given sectors 101, and/or providing wireless service to given sectors 101).

In some embodiments, GOS 105 may communicate with base stations 103 of sectors 101 and/or UEs located within such sectors 101 via an application programming interface ("API"), an X2 interface, and/or some other suitable communication pathway, in order to receive such information. For example, base stations 103 and/or UEs communicatively coupled to respective base stations 103 may "push" such information to GOS 105 (e.g., via the API) on a periodic or intermittent basis, upon the occurrence of trigger events (e.g., the detection of a reference signal from one or more base stations 103 by a ULE located within a given sector 101, one or more Quality of Service ("QoS") metrics exceeding a threshold value, a connection or disconnection of one or more UEs to one or more base stations 103, and/or other events), and/or on some other basis. In some embodiments, GOS 105 may "pull" (e.g., request or otherwise obtain) such information from the UEs, base stations 103, and/or other device or system that receives, collects, maintains, and/or provides such information. For example, GOS 105 may be communicatively coupled to a Service Capability Exposure Function ("SCEF") of a core network associated with base stations 103, a Network Exposure Function ("NEF"), and/or other suitable device, system, function, etc.

As further shown, GOS 105 may determine (at 104) one or more sector models associated with respective sectors 101, as well as interference models associated with respective sectors 101, based on the received RF metrics. For example, as discussed below, GOS 105 may use AI/ML techniques or other suitable techniques to identify one or more sector models that includes attributes that are similar to the attributes associated with respective sectors 101. For example, when determining whether attributes of a given sector model are "similar" to attributes of a given sector 101, GOS 105 may generate one or more scores, classifiers, or the like, and/or may perform a suitable similarity analysis to determine a measure of similarity between attributes of a set of sector models and attributes of a given sector 101. In some embodiments, GOS 105 may select a particular sector model if the measure of similarity exceeds a threshold measure of similarity. Additionally, or alternatively, GOS 105 may select a particular quantity of highest-scoring sector models (e.g., the highest scoring sector mode, the top three scoring sector models, etc.). In some embodiments, GOS 105 may select a particular quantity of highest-scoring sector models, so long as the scores associated with such sector models exceeds a threshold score (e.g., the top three scoring sector models so long as the top three scoring sector models exceed the threshold score, the top two scoring sector models if the third highest-scoring sector model is below the threshold score, etc.).

As further discussed in more detail below, GOS 105 may further determine (at 104) one or more interference models for one or more sectors 101 based on the sector models identified with respect to respective sectors 101, as well as the RF metrics received (at 102) with respect to the respective sectors 101. As one example, a particular interference model may indicate that reference signals from a particular base station 103 of a particular sector 101 is causing interference with signals from base stations 103 of the same sector 101 and/or of surrounding sectors 101. As another example, a particular interference model may indicate that an unknown interference source is present within a given sector 101. In some embodiments, a particular interference model may indicate that a transient interference source (e.g., a drone or some other mobile interference source) is temporarily present within a given sector 101.

As additionally discussed below, GOS 105 may determine (at 104) one or more remedial and/or performance-enhancing actions to perform with respect to a given sector 101. For example, GOS 105 may determine actions such as modifying Physical Resource Blocks ("PRBs") used by one or more base stations 103 to carry reference signals (e.g., modifications in the time and/or frequency domains of such signals), modifying a transmit power of reference signals (e.g., without modifying the transmit power of user plane signals, and/or modifying the transmit power of user plane signals by a different amount than the modification of the transmit power of reference signals). In some embodiments, the actions may include one or more other types of actions, such as modifying a beamforming configuration of one or more base stations 103 (e.g., beam width, power, azimuth angle, and/or tilt angle), implementing or modifying a cell suspend mode at one or more base stations 103, implementing or modifying a coordinated multi-point configuration of multiple base stations 103 (e.g., base stations 103 that interfere with each other), and/or other suitable actions to reduce interference.

As noted above, the selection (at 104) of actions based not only on RF and/or interference-related metrics (e.g., based on interference models), but also based on the characteristics and/or attributes of a sector 101 (e.g., based on sector models), may allow for interference solutions that are better tailored to sectors with particular configurations, attributes, or the like. Such solutions may be more likely to succeed and/or have more impact (e.g., reduction of interference) than actions selected solely based on the detection of interference in a given sector 101.

In some embodiments, GOS 105 may receive (at 102) RF metrics overtime, and may select (at 104) different sets of actions (e.g., for particular sectors 101 and/or varying sets of sectors 101) based on different RF metrics received at different times and/or time periods. As one example, a particular sector 101 may exhibit a first set of interference metrics at times corresponding to a morning or afternoon weekday commute, and may exhibit a second set of interference metrics at times corresponding to an evening or weekend. In this example, GOS 105 may determine (at 104) a first interference model (or set of interference models) and associated actions during morning or afternoon hours on weekdays, and may determine a second interference model (or set of interference models) and one or more associated actions during evening hours and/or weekends.

GOS 105 may further output (at 106) information indicating the identified actions to respective sectors 101. As discussed below, GOS 105 may select particular sectors 101 (and/or network infrastructure located therein), out of the set of candidate sectors 101, to perform the actions based on one or more criteria (e.g., referred to as sector "dominance"). GOS 105 may, for example, indicate the determined actions to respective base stations 103 associated with sectors 101, to a management device or system associated with one or more sectors 101, and/or some other device or system. For the sake of brevity, the performance of a given action by a network infrastructure element located in or serving sector 101 will be referred to herein as sector 101 "performing" the action.

Respective sectors 101 may perform (at 108) the indicated actions, and GOS 105 may continue to receive (at 102) up-to-date RF and/or interference metrics associated with sectors 101. GOS 105 may, based on continuing to receive the up-to-date RF and/or interference metrics, modify the determination of interference models associated with a particular sector 101. In some embodiments, GOS 105 may select a new set of actions for sector 101 based on the up-to-date RF and/or interference metrics. In some embodiments, GOS 105 may modify one or more sector models, interference models, and/or other information based on whether the performed (at 108) actions reduced interference indicated by the RF and/or interference metrics, and/or based on how much effect the actions had on such metrics.

While described in the context of being performed by GOS 105, in some embodiments, one or more devices or systems associated with sectors 101 may perform one or more of the operations described above in lieu of, or in addition to, GOS 105. For example, in some embodiments, one or more devices or systems of sector 101 may identify a particular action based on a given sector model and/or interference model, and/or based on continuing to monitor RF and/or interference metrics associated with sector 101 after performing (at 108) a particular action or set of actions.

Figure 2:
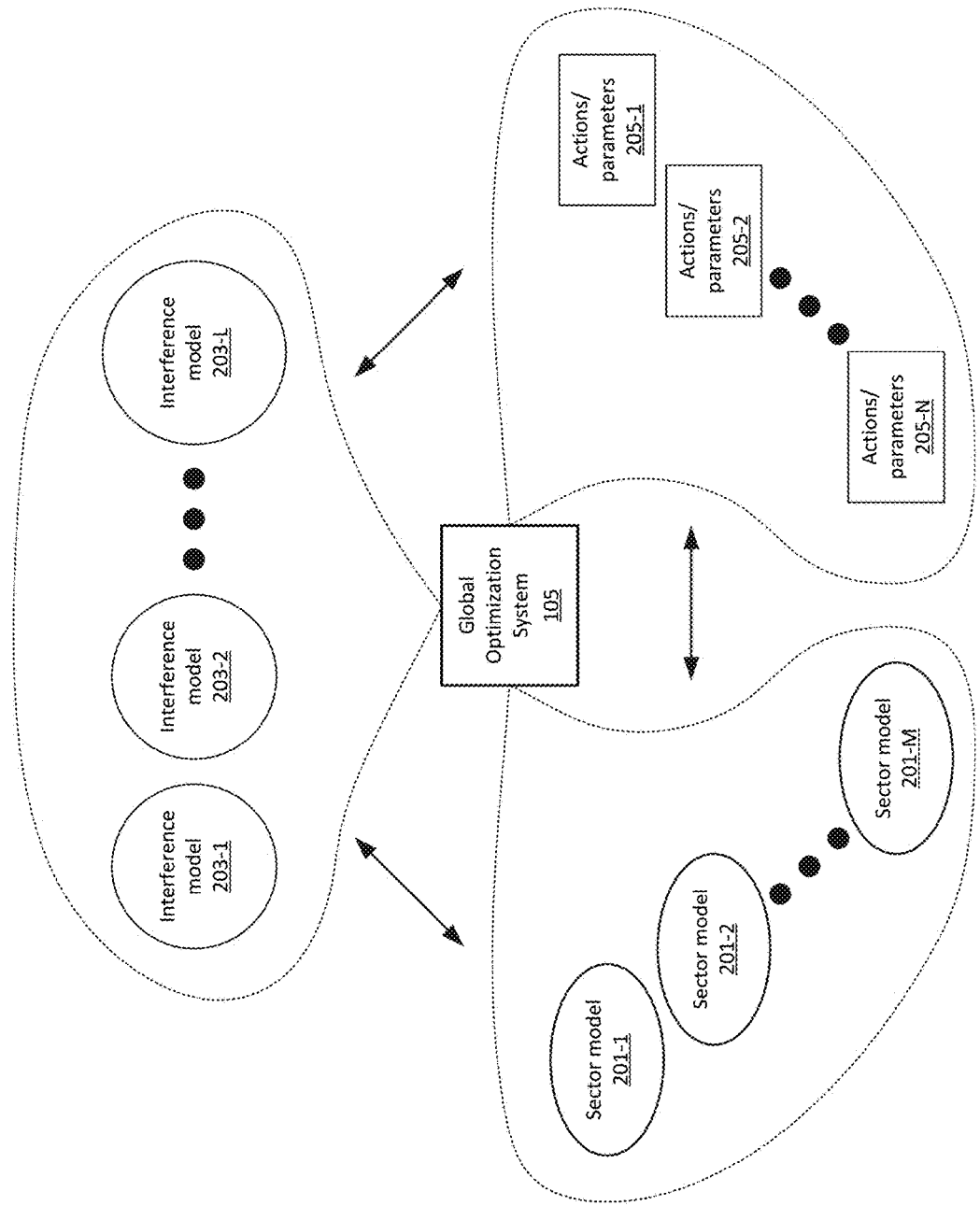
FIG. 2 illustrates example interference models, sector models, and/or actions/parameters that may be generated, received, maintained, provided, etc. by a Global Optimization System ("GOS") of some embodiments.

FIG. 2 illustrates example interference models, sector models, and/or actions/parameters that may be generated, received, maintained, provided, etc. by GOS 105. For example, GOS 105 may be associated with a set of sector models 201, such as example sector models 201-1, 201-2, and 201-M. Further, GOS 105 may be associated with a set of interference models 203, such as example interference models 203-1, 203-2, and 203-L. Additionally, GOS 105 may be associated with a set of actions/parameters 205, such as example actions/parameters 205-1, 205-2, and 205-N.

GOS 105 may generate and/or modify sector models 201, interference models 203, and/or actions/parameters 205 based on AI/ML techniques or other suitable techniques. For example, GOS 105 may generate, modify, refine, etc. sector models 201, interference models 203, and/or actions/parameters 205 based on an evaluation of real-world data from sectors 101 and/or simulations of RF and/or interference metrics in a simulation and/or test environment. GOS 105 may further determine or identify correlations between respective sector models 201, interference models 203, and/or actions/parameters 205 using AI/ML techniques or other suitable techniques.

Figure 3:
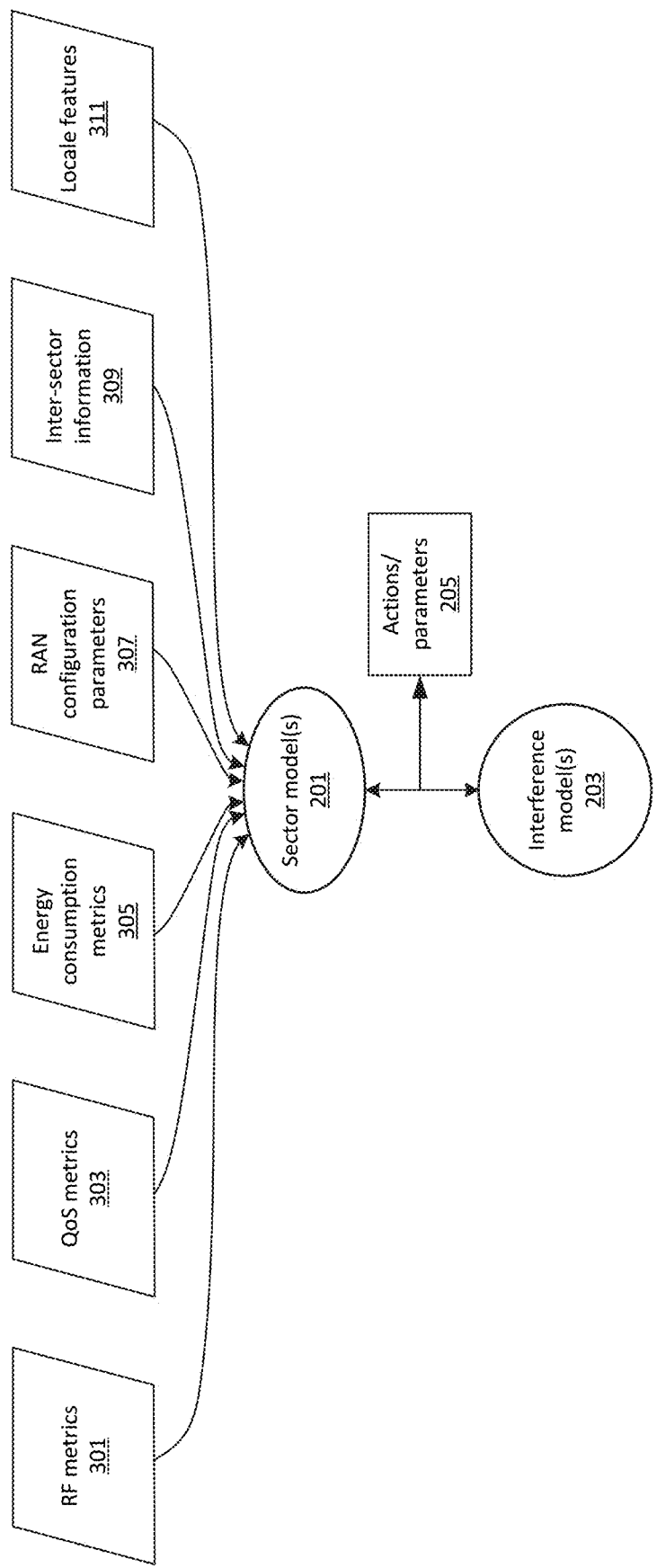
FIG. 3 illustrates example attributes associated with a particular sector model, in accordance with some embodiments.

For example, as shown in FIG. 3, sector model 201 may include RF and/or interference metrics 301 (referred to simply as "RF metrics 301" for the sake of brevity), Quality of Service ("QoS") metrics 303, energy consumption metrics 305, RAN configuration parameters 307, inter-sector information 309, locale features 311, and/or one or more other types of information.

RF metrics 301 associated with a given sector 101 may include metrics related to the propagation of RF signals from network infrastructure within sector 101 (or providing service to sector 101). For example, RF metrics 301 may include RSSI values, RSRP values, SINR values, CQI values, or other indicators of RF signal quality or strength. In some embodiments, RF metrics 301 may be determined by UEs or other RF signal-receiving devices located within or near (e.g., within a threshold distance of) sector 101.

For example, a given UE may be configured to scan for the presence of RF signals, such as reference signals, emitted by one or more base stations 103. In some scenarios, such reference signals may be broadcasted (or otherwise transmitted) by base stations 103 at a higher transmission power than other transmissions output by base stations 103, such as transmissions carrying user plane data. The UE may, in some embodiments, generate one or more measurement reports, which may indicate a signal strength of such transmissions received from one or more base stations 103, and may further include an identifier of the base station(s) 103 from which such transmissions were received.

The measurement reports may further include information regarding the transmissions themselves, such as a frequency (or range of frequencies) on which the RF signals were detected by the UE, as well as timing information (e.g., timing offsets, frame, time slot, etc.) associated with the RF signals. In this manner, the PRBs associated with the received RF signals may be indicated or derived from the measurement reports, where a particular PRB refers to a particular time-and-frequency slot in a time-and-frequency domain. A UE may also be configured to determine or report measures of interference, such as SINR, received RF signal power (e.g., at particular frequencies and/or time slots), or other measures of interference.

In some embodiments, UEs may use device-to-device ("D2D") communications, "direct" communications, personal area networks ("PANs"), or other suitable communication pathways to detect the presence of other UEs. For example, the presence of multiple UEs within communication range of each other may be a factor that may contribute to detected interference. For example, the detection of interference by a first UE coupled with a D2D detection of a second UE may suggest that the interference may be caused by, or contributed to by, the presence of the second UE.

As noted above, GOS 105 may receive the measurement reports and/or other suitable RF metrics 301 from UEs (e.g., via an API or other suitable communication pathway), and/or from base stations 103 (e.g., via an X2 interface or other suitable communication pathway, where base stations 103 may receive measurement reports from UEs via Radio Resource Control ("RRC") messaging or some other suitable communication pathway). In some embodiments, GOS 105 may receive RF metrics 301 from some other device or system.

Based on the received RF metrics 301, GOS 105 may determine a "baseline" or "expected" level of interference, received power, and/or other RF metrics in sector 101. As discussed below, such "baseline" or "expected" levels may be determined on a granular basis (e.g., based on locations or regions within given sectors 101, such as regions that are delineated by distance and angle from a reference point). Further, the "baseline" or "expected" RF or interference levels may be determined on a temporal basis, which may reflect fluctuations that vary on a periodic, repeating, or otherwise determinable basis (e.g., fluctuations based on weekday commutes, seasonal traffic, events at venues, or other phenomena). In this manner, sector model 201 may be determined for a given sector 101 based on temporal and/or spatial aspects of RF metrics 301. Additionally, or alternatively, different sector models 201 may be determined for sector 101 (e.g., for different times or time periods, and/or for different locations or regions within sector 101).

QoS metrics 303 may reflect QoS metrics associated with a particular sector 101 over a particular period of time. For example, QoS metrics 303 may include metrics relating to latency, bandwidth, jitter, packet loss, and/or other metrics related to network layer performance, application layer performance, or other "higher" layer performance (e.g., performance at a layer above a physical layer and/or a data link layer). QoS metrics 303 associated with a given sector 101 may be collected from and/or reported by UEs receiving wireless service within sector 101 and/or from a base station 103 located within sector 101, and/or may be received from base station 103 located in or providing wireless service to sector 101.

Energy consumption metrics 305 may indicate an amount of energy consumed at the particular sector 101 over the particular period of time. For example, energy consumption metrics 305 may indicate an amount of electrical power (e.g., kilowatt-hours or some other measure of consumed power) consumed by network infrastructure elements (e.g., base stations 103, data centers, routers, hubs, and/or other equipment) within or serving sector 101 over a given period of time.

RAN configuration parameters 307 may include parameters such as an indication of quantity and/or position (e.g., geographical position) of physical infrastructure hardware (e.g., antennas, radios, data centers, or the like) associated with one or more RANs in sector 101. In some embodiments, RAN configuration parameters 307 may indicate particular radio access technologies ("RATs") implemented in sector 101 (e.g., a LTE RAT, a 5G RAT, etc.), beam configurations implemented in sector 101 (e.g., beam quantity, beam azimuth angles, beam width, beam transmission power, etc.), antenna sensitivity (e.g., receive sensitivity), MIMO configuration information, and/or other suitable information. In some embodiments, RAN configuration parameters 307 may indicate the height of one or more antennas associated with one or more base stations 103 (or other RF-emitting equipment), a coverage area of one or more antennas (e.g., a polygon, distance from a reference point, or other descriptor of geographical regions in which RF signals are received from the one or more antennas), or other parameters of the one or more antennas.

In some embodiments, RAN configuration parameters 307 may include information indicating a capacity or other capability of a given sector 101 and/or one or more base stations 103 located in (or providing service to) sector 101. For example, RAN configuration parameters 307 may indicate an RF channel bandwidth within sector 101, an amount of available and/or used PRBs associated with one or more base stations 103 located in (or providing service to) sector 101, threshold quantities of supported UEs simultaneously connected to one or more base stations 103 located in (or providing service to) sector 101, threshold amounts of data or throughput that may be sent and/or received by one or more base stations 103 located in (or providing service to) sector 101, and/or other capability and/or capacity-related information.

Inter-sector information 309 may include information associated with sectors adjacent to or proximate to a given sector 101. For example, inter-sector information 309 may include RF metrics, RAN parameters, QoS metrics, and/or energy consumption metrics, associated with sectors adjacent to or within a threshold distance of sector 101. In some embodiments, inter-sector information 309 may include mobility information, which may be associated with mobility of UEs between sector 101 and neighboring sectors. For example, inter-sector information 309 may indicate that UEs that are located in sector 101 are likely to be stationary within sector 101 for a first duration of time (e.g., approximately one hour), and then that such UEs travel to a particular neighboring sector. As another example, inter-sector information 309 may indicate that UEs that are located in the neighboring sector are relatively likely to enter the particular sector 101.

Locale features 311 may include information indicating attributes and/or features of the geographical area. For example, locale features 311 may include information relating to building layout and/or density, topographical features (e.g., mountains, valleys, forests, streams, etc.), weather-related information, air quality-related information (e.g., smog density, particulate density, fog density, etc.), and/or other factors that may affect RF metrics, energy consumption metrics, QoS metrics, or other metrics. Locale features 311 may include geographical coordinates (e.g., latitude and longitude coordinates, Global Positioning System ("GPS") coordinates, or the like) or other suitable location information, to indicate the geographical locations of respective features.

As described below, a given sector 101 may be associated with one or more sector models 201 based on a comparison of the above-described factors, and/or one or more other factors, of sector 101 to such factors associated with a set of candidate sector models 201. Briefly, for example, GOS 105 may determine that a particular sector 101, that exhibits a particular set of RF metrics 301, a particular set of QoS metrics 303, a particular set of energy consumption metrics 305, and a first set of locale features 311 (e.g., urban features such as high-rise buildings) is associated with a first sector model 201, while another sector 101, that exhibits a similar set of RF metrics 301, a similar set of QoS metrics 303, and a similar set of energy consumption metrics 305, but a different second set of locale features 311 (e.g., rural features such as relatively flat areas with relatively low building density) is associated with a different second sector model 201.

Generally, a given sector model 201 may describe or reflect parameters, metrics, attributes, etc. of a given sector 101. As noted above, a particular sector model 201 may include temporal or location-based fluctuations or variations, and/or different sector models 201 may be associated with a given sector 101 at different times or regions within sector 101.

Interference models 203 may indicate different types or amounts of interference exhibited within a given sector 101. For example (as described in more detail below with respect to FIGS. 4A-4C), a particular interference model 203 may indicate that RF metrics associated with a given sector 101, received over a particular time period, do not match "baseline" or "expected" RF metrics (e.g., as indicated by one or more sector models 201 associated with sector 101). As another example (as described in more detail below with respect to FIG. 5), a particular interference model 203 may indicate that colliding RF signals (e.g., RF signals received from multiple antennas (e.g., other than situations in which signals from multiple antennas are expected, such as a MIMO configuration, an antenna teaming configuration, or the like), base stations 103, or other types of network infrastructure hardware) have been detected within sector 101.

Figure 4A:
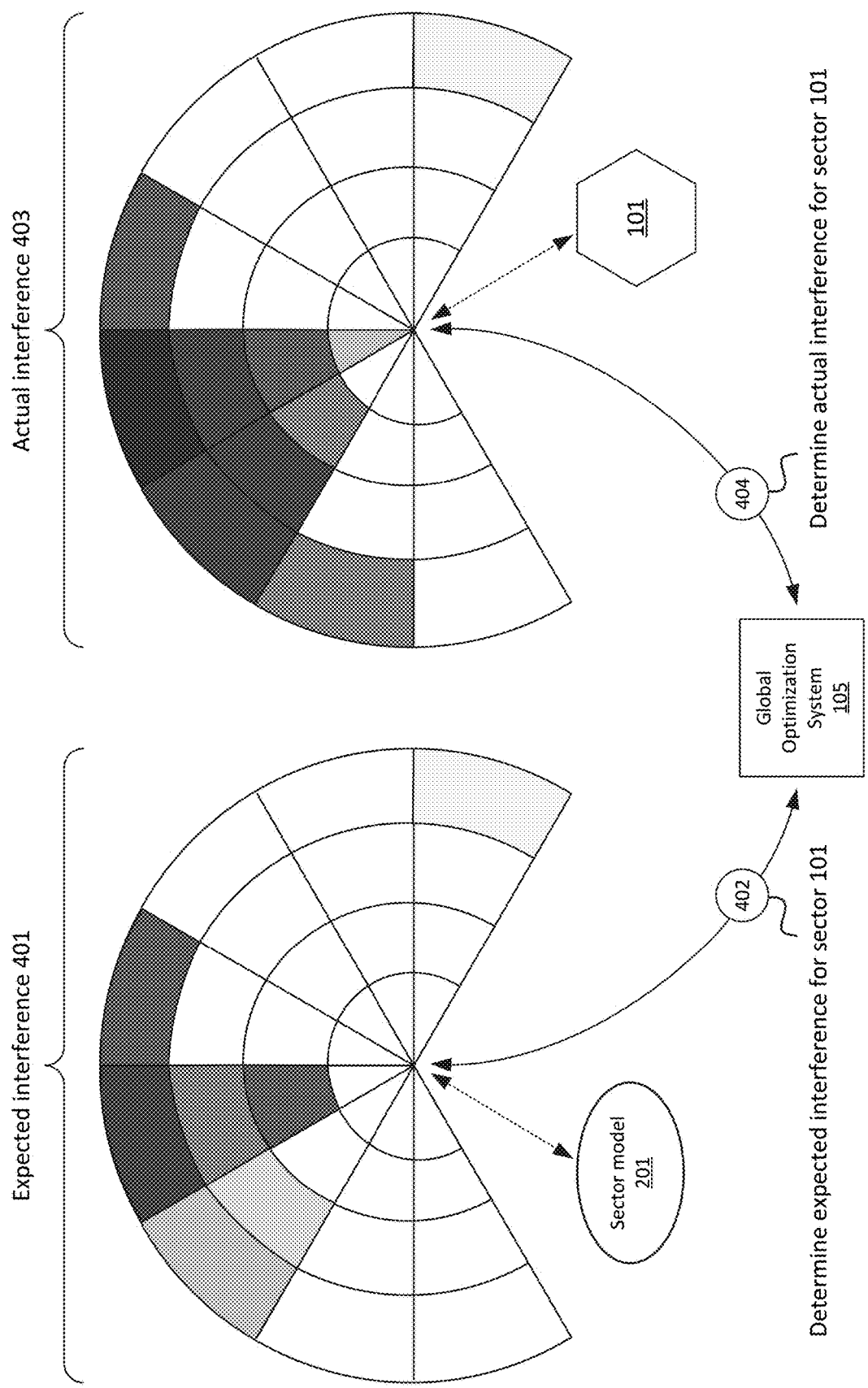
FIGS. 4A-4C illustrate an example determination of an interference model associated with a given sector, in accordance with some embodiments.

As shown in FIG. 4A, GOS 105 may determine (at 402) expected interference 401 associated with a particular sector 101. Expected interference 401 may be based on, for example, RF metrics 301 associated with sector 101 (e.g., historical RF metrics received over time). In some embodiments, expected interference 401 may be determined based on a particular sector model 201 associated with sector 101. As noted above, expected interference 401 may vary on a temporal basis (e.g., based on time of day, day of week, season, etc.). Thus, the example described here is in the context of levels of expected interference 401 at a particular time. Actual interference 403 may be received from sector 101 (e.g., from one or more UEs within sector 101, from one or more base stations 103 located in or serving sector 101, and/or one or more other suitable devices or systems). Generally, expected interference 401 may relate to historical RF metrics received, while actual interference 403 may relate to RF metrics received in "real-time" or at "run time" (e.g., GOS 105 may determine remedial actions to perform in order to reduce interference indicated by actual interference 403 for sector 101).

Figure 4B:
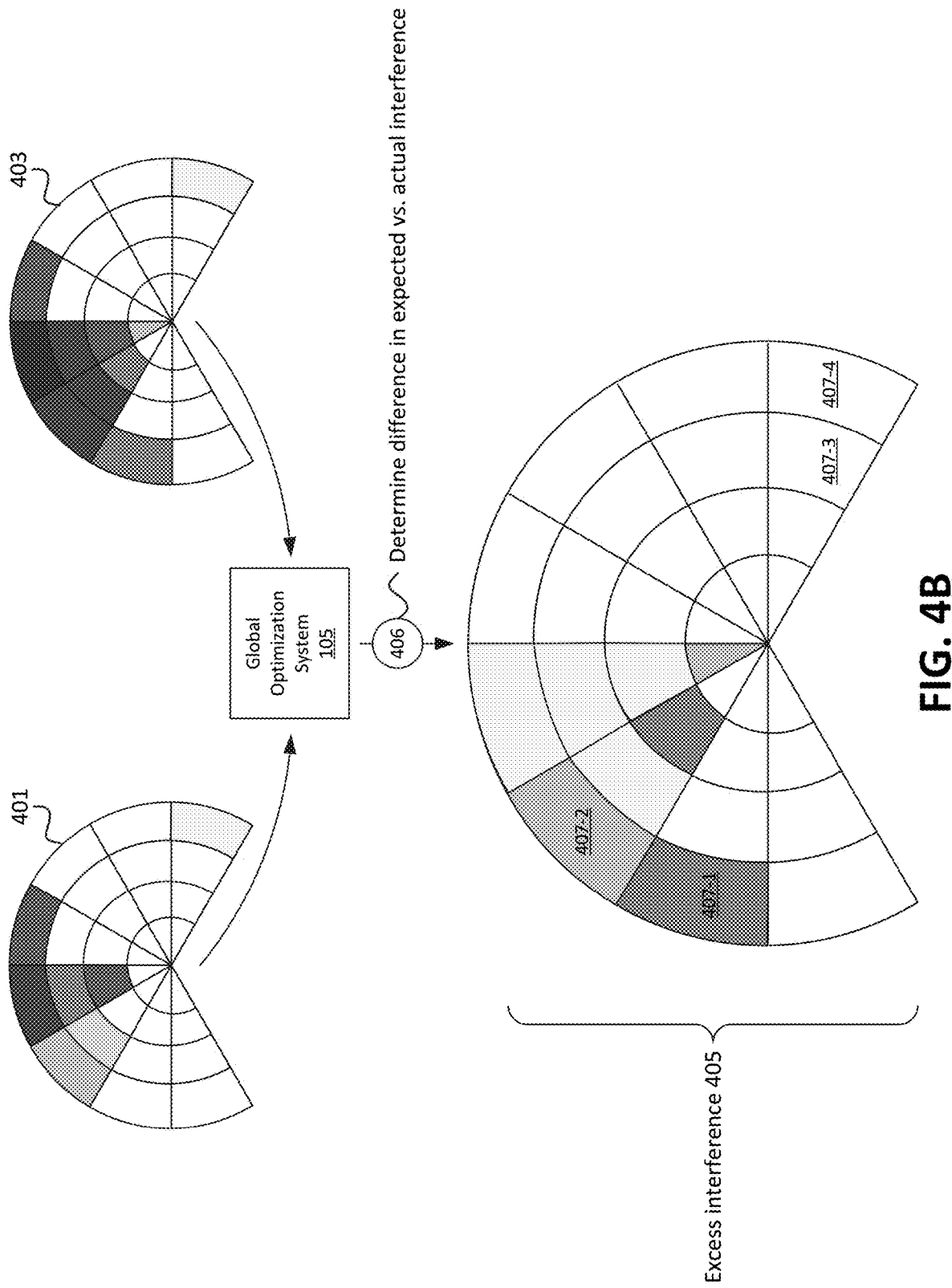
Figure 4C:
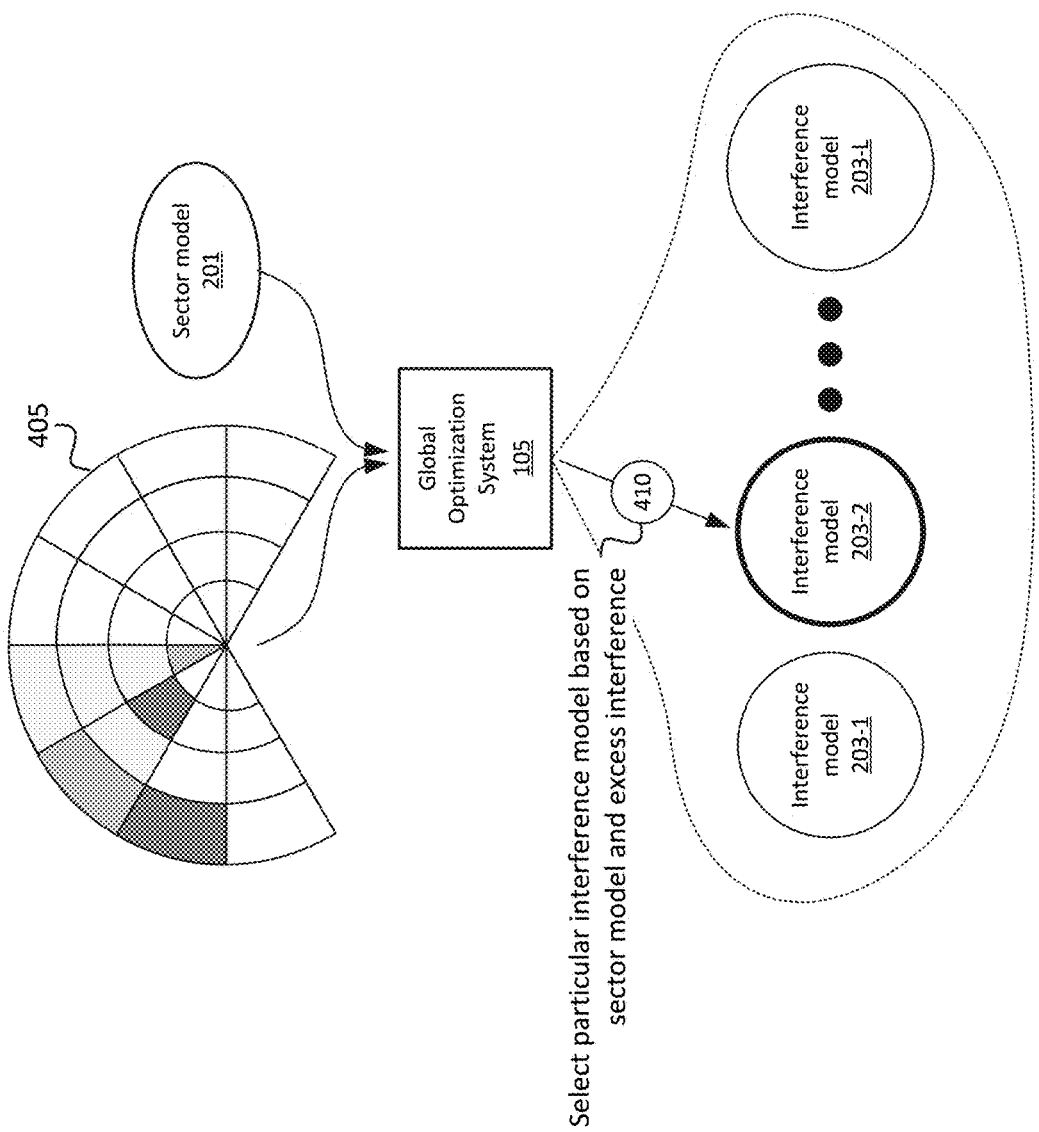

In the examples of FIGS. 4A-4C, geographical regions associated with a particular sector 101 are represented by shapes formed by arcs radiating from a reference point as well as angles from the reference point. The geographical regions depicted in these figures may represent the entirety of sector 101, and/or may represent a portion of a particular sector. In some embodiments, the reference point may correspond to the location of one or more base stations 103, antennas, and/or other RF-emitting network infrastructure hardware. In some embodiments, the reference point may correspond to a center point of sector 101, and/or may be an arbitrary point within sector 101 (e.g., not necessarily based on the location of a particular base station 103 or other equipment). In practice, interference may be determined on a per-sector basis, or on some granular basis (e.g., different measures of interference tracked within sector 101) that is different from the examples shown here.

The shading in these figures generally represents amounts of interference detected at respective locations within sector 101. For example, darker shading may represent relatively more interference (and/or interference above a threshold level), while lighter shading (or no shading) may represent relatively less interference (and/or interference below a threshold level). In some embodiments, "interference" may be measured or quantified as a difference between RF signal power received at a receiver (e.g., a UE within sector 101) and a reference RF signal power (e.g., a transmit power of one or more RF signals of which the UE is in range). In some embodiments, interference may include, and/or may be based on, one or more RSRP values, SINR values, RSSI values, and/or other suitable values received from UEs or other devices within sector 101, and/or other suitable values or measures of interference.

As further shown, GOS 105 may determine (at 404) actual interference 403 associated with sector 101. For example, GOS 105 may receive RF metrics, interference metrics, or the like from UEs and/or other devices or systems located within sector 101. As similarly discussed above, actual interference 403 may include, and/or may be based on, one or more RSRP values, SINR values, RSSI values, and/or other suitable values received from UEs or other devices within sector 101, and/or other suitable values or measures of interference.

As shown in FIG. 4B, GOS 105 may further determine (at 406) a difference between expected interference 401 and actual interference 403, in order to determine excess interference 405. In some embodiments, GOS 105 may perform a difference operation between expected interference 401 and actual interference 403 to determine the difference in interference between expected interference 401 and actual interference 403. That is, interference indicated in actual interference 403, which is not indicated in expected interference 401, may be referred to as "excess" interference, as such actual interference 403 differs (e.g., is in excess of) from levels of expected interference 401. For example, GOS 105 may determine that actual interference 403 indicates that region 407-1 is associated with a particular level of interference that is not present in expected interference 401. As such, region 407-1 may be represented, in excess interference 405, as a shaded region. Further, since the corresponding level of interference in actual interference 403 for region 407-1 is different from the relatively low (or no) interference in the same region as indicated in expected interference 401, the level of interference (and the corresponding level of shading that represents such interference) in excess interference 405 may be the same or about the same as shown in actual interference 403.

On the other hand, expected interference 401 and actual interference 403 (e.g., where the numbering of regions 407 in excess interference 405 refers to the same regions in expected interference 401 and actual interference 403) may both reflect some level of interference at region 407-2, where the interference for region 407-2 in actual interference 403 is greater than the interference for region 407-2 in expected interference 401. As such, the shading in region 407-2, in excess interference 405, may be a shade in between the shading shown in expected interference 401 and actual interference 403 for region 407-2.

As a further example, expected interference 401 and actual interference 403 may both indicate no interference (and/or a level of interference below a threshold level of interference) at region 407-3. Accordingly, excess interference 405 may indicate no excess interference at region 407-3 (e.g., no difference, or no difference above a threshold difference in interference at region 407-3 in expected interference 401 and actual interference 403). As yet another example, expected interference 401 and actual interference 403 may both indicate the same level of interference (and/or about the same level of interference) at region 407-4. Accordingly, excess interference 405 may indicate no excess interference at region 407-4 (e.g., no difference, or no difference above a threshold difference in interference at region 407-4 in expected interference 401 and actual interference 403).

As shown in FIG. 4C, GOS 105 may further select (at 410) a particular interference model 203, from a set of candidate interference models 203, based on the identified excess interference 405, and further based on one or more sector models 201 associated with sector 101. For example, as described below, GOS 105 may use one or more AI/ML techniques to determine an appropriate interference model 203 (e.g., interference model 203-2, in this example) to represent the interference (e.g., the excess interference) associated with sector 101, where the selection is further based on attributes of sector 101 (e.g., sector model 201).

Figure 5:
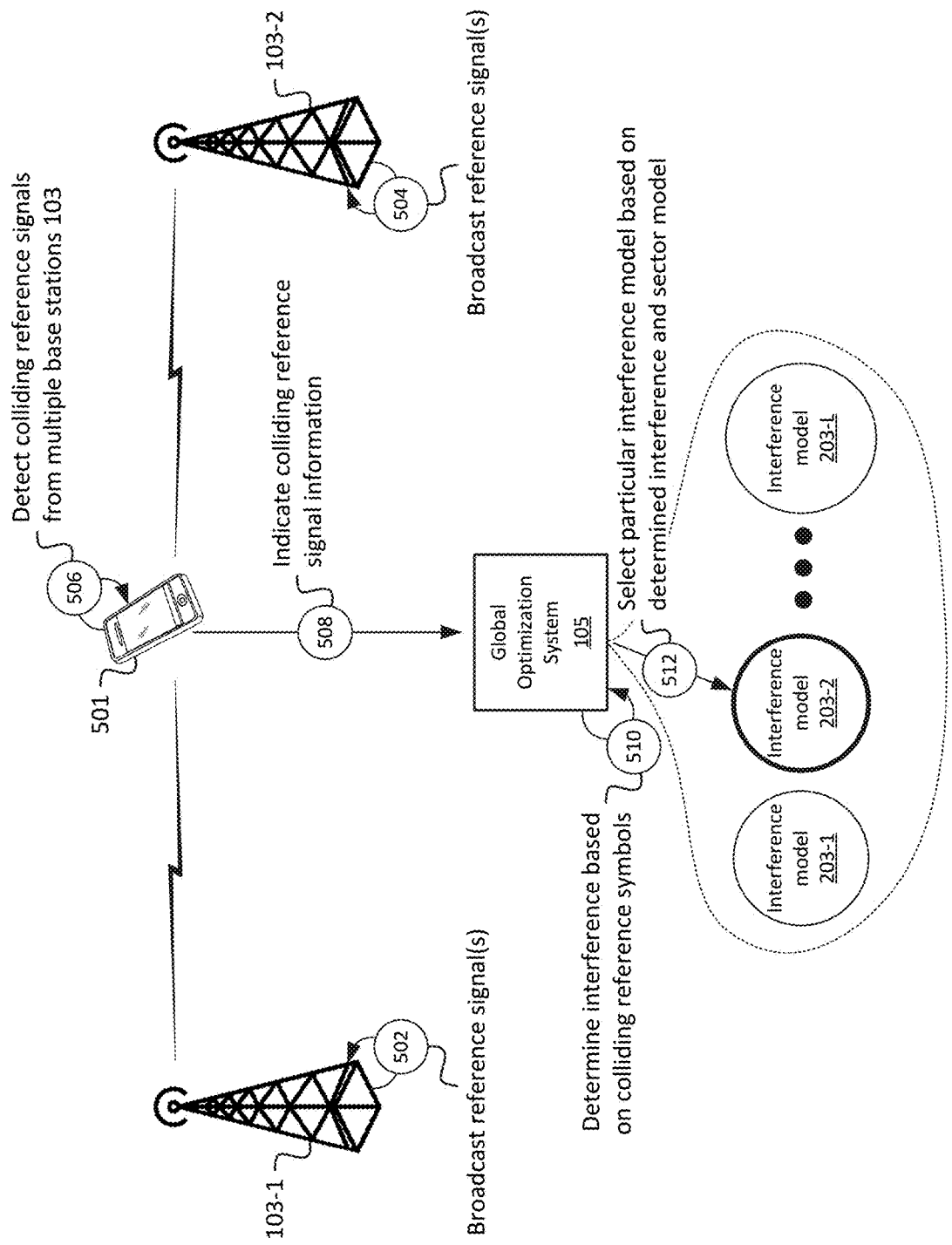
FIG. 5 illustrates an example of an interference model associated with a given sector, in accordance with some embodiments.

As shown in FIG. 5, GOS 105 may additionally, or alternatively, identify interference based on the detection of colliding signals at a particular geographical location. For example, two example base stations 103-1 and 103-2 may broadcast (at 502 and 504, respectively) reference signals. As discussed above, base stations 103-1 and/or 103-2 may broadcast the reference signals at a higher power than other transmissions, such as transmissions related to RF signals carrying user plane data. Thus, while the RF signals carrying user plane data may not collide, UE 501 may nevertheless detect (at 506) colliding reference signals from base stations 103-1 and 103-2. For example, UE 501 may detect that reference signals have been received on the same PRBs (e.g., on the same frequencies and with the same timing) from base stations 103-1 and 103-2. As another example, UE 501 may detect that reference signals have been received on the same frequency or frequencies from base stations 103-1 and 103-2 but with different timing, and/or that reference signals have been received on a different frequency or frequencies from base stations 103-1 and 103-2 but with the same timing.

Such a scenario may occur, for example, in a Dynamic Spectrum Sharing ("DSS") configuration, in which base stations 103 may dynamically operate at different frequency bands and/or according to different radio access technologies ("RATs"), such as a base station 103 that operates according to a LTE RAT in certain scenarios (e.g., where a relatively large quantity or proportion of connected UEs have LTE capability but not 5G capability), while operating according to a 5G RAT in other scenarios (e.g., where a relatively large quantity or proportion of connected UEs have 5G capability and/or are sending and/or receiving latency-sensitive traffic, such as traffic with a relatively high QoS level).

UE 501 may indicate (at 508) the detected colliding RF signals (e.g., colliding reference signals) to GOS 105. For example, as discussed above, UE 501 may provide such information to GOS 105 via an API, may provide such information to a connected base station 103 (e.g., base station 103-1, base station 103-2, and/or some other base station 103 to which UE 501 is connected) via one or more measurement reports, and/or may otherwise provide the information to GOS 105 or some other devices or systems that relays the information to GOS 105. The information from UE 501 may include one or more cell identifiers or other suitable identifiers of base station 103-1 and 103-2, from which the colliding RF signals were detected. Further, the information from UE 501 may include geographical location information associated with UE 501 at the time the colliding RF signals were detected (at 506). In this manner, GOS 105 may be capable of identifying the particular sources of interference (e.g., the sources of the colliding RF signals), as well as a location at which the interference was detected.

GOS 105 may accordingly select (at 512) a particular interference model 203 (e.g., interference model 203-2, in this example) based on the indicated colliding RF signal information, and further based on one or more sector models 201 associated with the location of UE 501 (e.g., a sector model 201 of a particular sector 101 in which UE 501 was located when detecting (at 506) the colliding RF signals).

As noted above, GOS 105 may generate, maintain, refine, etc. (e.g., using one or more AI/ML techniques or other suitable techniques) one or more associations between respective interference models 203 and one or more sets of actions/parameters 205. In some embodiments, such associations may be multi-factor associations. For example, a first set of actions/parameters 205 may be associated with a particular interference model 203 and a first sector model 201, while a second set of actions/parameters 205 may be associated with the same interference model 203 and a second sector model 201. As another example, a first set of actions/parameters 205 may be associated with a first interference model 203 and a particular sector model 201, while a second set of actions/parameters 205 may be associated with a second interference model 203 and the same sector model 201.

For example, each sector model 201-interference model 203 pair may be associated with one or more sets of actions/parameters 205, as each particular set of actions/parameters 205 may have been determined (e.g., based on real-world results and/or simulated results) as increasing the performance (e.g., reducing interference) of one or more sectors 101 that match a particular sector 101 that is associated with a particular sector model 201 and interference model 203. As noted above, actions/parameters 205 may include modifying reference signal PRBs (e.g., modifying the timing offsets and/or frequencies at which reference signals are transmitted in a given sector 101), modifying reference signal transmit power, activating or modifying a coordinated multi-point configuration, modifying beamforming parameters, and/or other suitable actions to reduce interference in sector 101 and/or surrounding sectors 101.

In some embodiments, GOS 105 may also determine affinity scores and/or other correlations between sector models 201, interference models 203, and respective sets of actions/parameters 205. Such affinity scores may generally indicate how effective a given set of actions/parameters 205 are for reducing interference in particular sector 101, given sector model 201 and interference model 203 associated with sector 101. When selecting a particular interference model 203 for sector 101 based on received or determined interference information (e.g., based on excess interference 405, detected (at 506) colliding RF signals, and/or other indications of interference), GOS 105 may select such interference model 203 based on affinities, scores, correlations, or the like between sector model 201 and interference model 203.

Similarly, when determining a particular set of actions/parameters 205 for a particular sector 101, GOS 105 may select the particular set of actions/parameters 205 from candidate sets of actions/parameters 205 based on an affinity, score, correlation, etc. between sets of actions/parameters 205 and sector model 201 and/or interference model 203. Further, as discussed below, the particular actions/parameters 205 may be determined based on a "dominance" of one or more sectors 101 at which interference has been detected, and/or one or more neighboring sectors 101 (e.g., adjacent sectors 101, and/or sectors 101 within a threshold distance of a particular sector 101).

Figure 6:
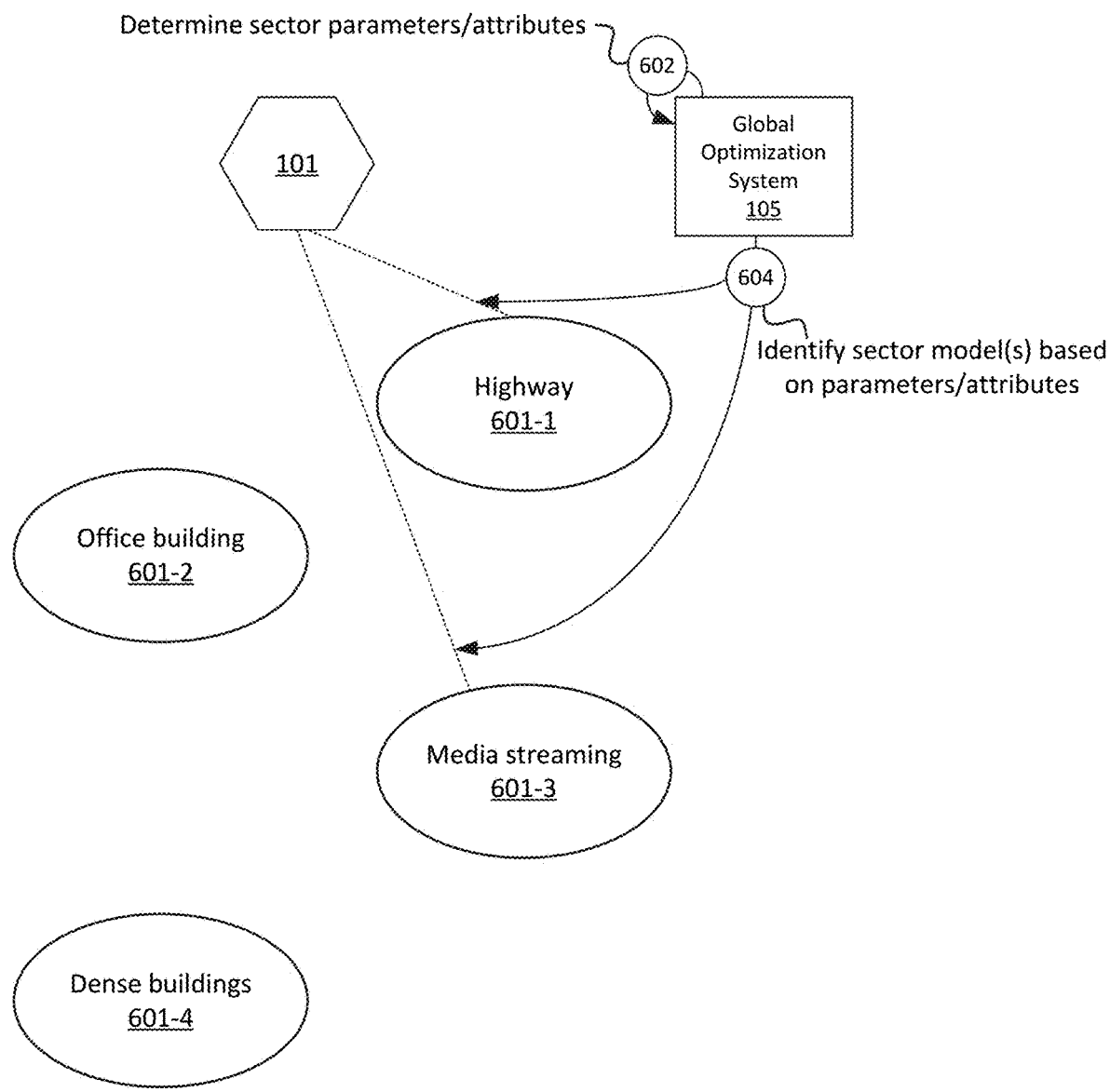
FIG. 6 illustrates an example of one or more sector models associated with a given sector associated with a RAN of a wireless network, in accordance with some embodiments.

FIG. 6 illustrates an example determination of one or more sector models 201 for a particular sector 101. As shown, GOS 105 may determine (at 602) parameters and/or attributes of sector 101. As discussed above, such parameters and/or attributes may include RF metrics 301, QoS metrics 303, energy consumption metrics 305, RAN configuration parameters 307, inter-sector information 309, locale features 311, and/or other suitable parameters, attributes, metrics, or the like. GOS 105 may further identify (at 604) one or more sector models 201 based on the determined parameters and/or attributes of sector 101.

In this example, GOS 105 may determine that sector 101 is associated with a "highway" sector model 601-1 and a "media streaming" sector model 601-3. As further shown, GOS 105 may not determine that sector 101 is associated with an example "office building" sector model 601-2, or an example "dense buildings" sector model 601-4. For example, GOS 105 may determine, based on a suitable similarity analysis of the parameters and/or attributes of sector 101, that sector models 601-2 and 601-4 do not match (e.g., correspond with a measure of similarity above a threshold measure of similarity) sector 101, and/or that sector models 601-1 and 601-3 match (e.g., have a higher measure of similarity with) the parameters and/or attributes of sector 101 more closely. As discussed above, operations 602 and 604 may be performed on an ongoing basis, such that the selection of particular sector models 601 may change based on updated parameters and/or attributes received by GOS 105 over time.

Figure 7A:
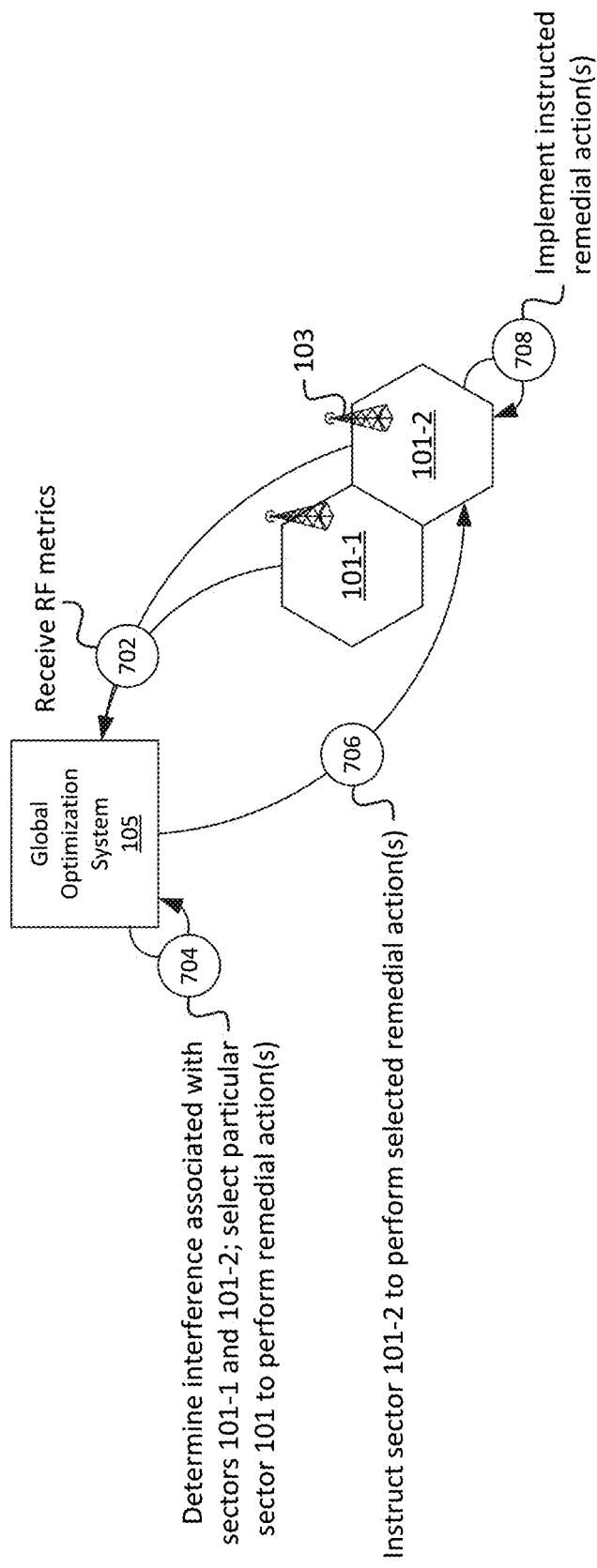
FIGS. 7A-7C illustrate example remedial actions that may be taken based on interference models determined with respect to one or more sectors, in accordance with some embodiments.
Figure 7B:
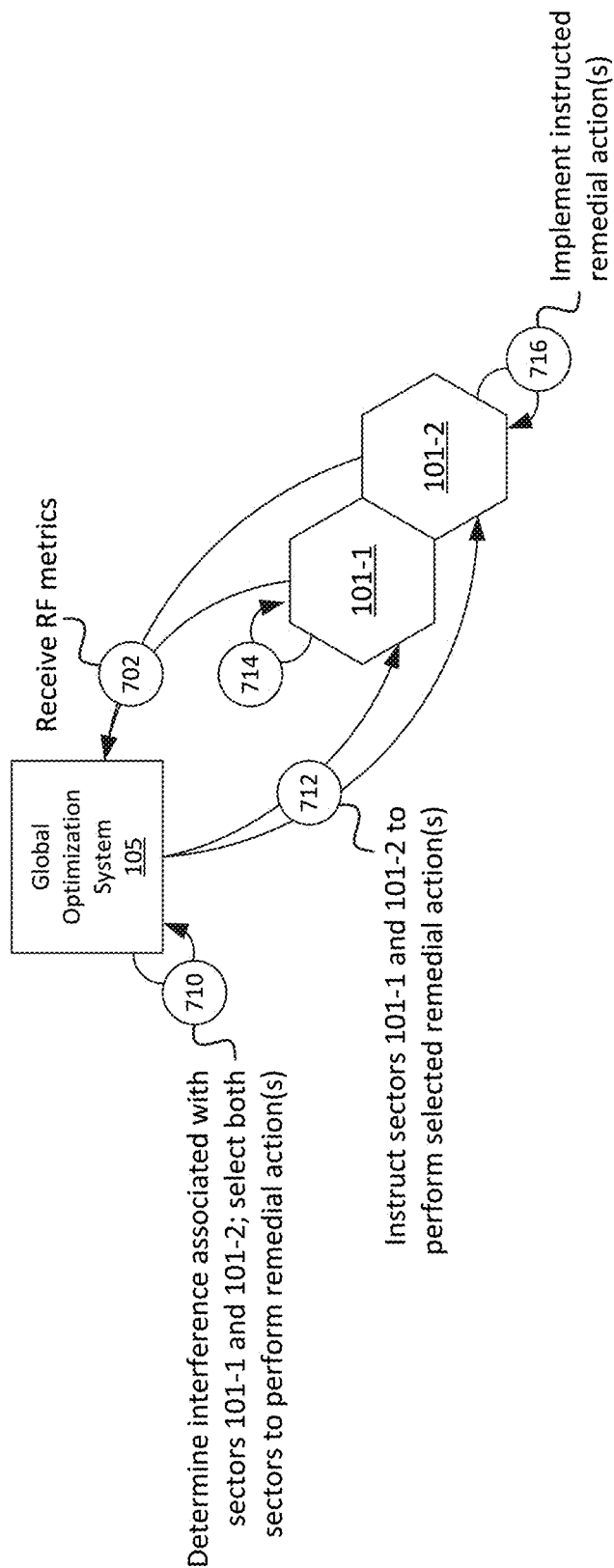
Figure 7C:
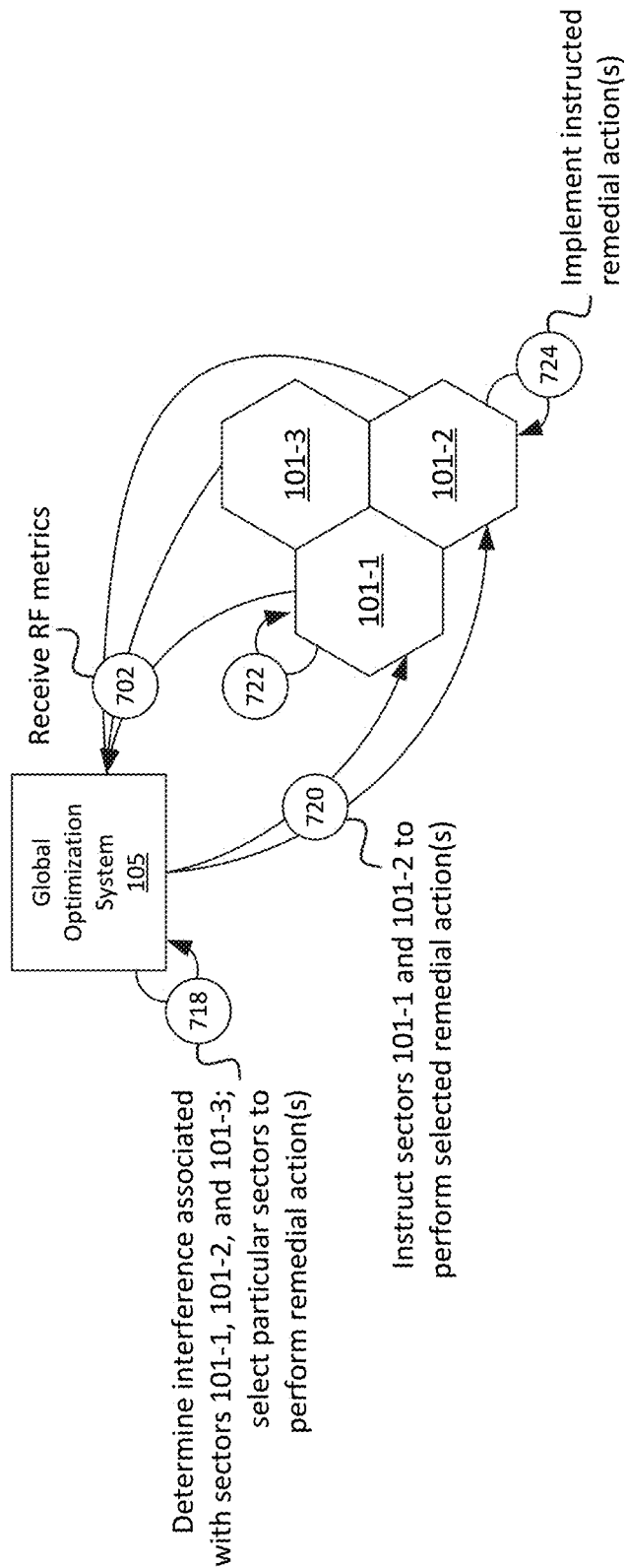

FIGS. 7A-7C illustrate the determination of interference associated with one or more sectors 101, the selection of one or more sectors 101 to perform one or more remedial actions 205, and the performance of the one or more actions 205 by the selected sector(s) 101. In FIG. 7A, for example, GOS 105 may receive (at 702) RF metrics associated with multiple sectors 101, such as sectors 101-1 and 101-2, as shown. As discussed above, such RF metrics may be received from UEs 501 located within sectors 101-1 and/or 101-2, and/or from one or more devices or systems that are located in and/or provide wireless service to sectors 101-1 and/or 101-2. Further assume that GOS 105 has determined appropriate sector models 201 that respectively correspond to sectors 101-1 and 101-2 (e.g., as similarly described above).

GOS 105 may further determine (at 704) interference associated with sectors 101-1 and 101-2. For example, RF signals emitted by one or more base stations 103 located in sector 101-1 may collide with RF signals emitted by one or more base stations 103 located in sector 101-2. As such, UEs 501 located at the edges of sectors 101-1 and 101-2 (e.g., near a border or intersection of sectors 101-1 and 101-2) may have detected colliding signals (e.g., reference signals and/or other RF signals) from base stations 103 located in sectors 101-1 and 101-2.

GOS 105 may determine (at 704) that sectors 101-1 and sectors 101-2 are associated with one or more particular interference models 203 based on the received RF metrics, as well as based on particular sector models 201 associated with each one of sector 101-1 and 101-2, and/or based on a combination or union of sector models 201 associated with both sectors 101-1 and 101-2 (and/or a particular sector model 201 associated with attributes of both sectors 101-1 and 101-2).

GOS 105 may, in some embodiments, select a particular sector 101 to perform remedial actions in situations where interference is detected at multiple sectors 101 (e.g., adjacent sectors 101 and/or sectors 101 within a threshold distance of each other). For example, as mentioned above, GOS 105 may determine a "dominance" score associated with each sector 101.

In some embodiments, the dominance score may be determined based on particular attributes of sectors 101, and/or may be based on sector models 201 associated with sectors 101. For example, a sector 101 that is associated with a relatively high elevation above sea level and/or with one or more antennas that are located at a relatively high altitude (e.g., above a threshold level of altitude) may be associated with a relatively higher dominance score, while a sector 101 that is associated with a relatively low elevation above sea level and/or with one or more antennas that are located at a relatively low altitude (e.g., below a threshold level of altitude) may be associated with a relatively lower dominance score.

In some embodiments, network load may be a factor based on which a dominance score for a particular sector 101 may be determined. For example, a sector 101 that is associated with a relatively high network load (e.g., based on quantity of UEs 501 located within sector 101, a quantity of UEs 501 connected to base stations 103 located in sector 101, an amount of traffic (e.g., throughput) sent or received by UEs 501 located in sector 101, RF resource utilization (e.g., percentage of available PRBs utilized for user plane data), and/or other measures of network load) may have a higher dominance score than a sector 101 with relatively low network load.

In some embodiments, energy consumption may be a factor based on which a dominance score for a particular sector 101 may be determined. For example, a sector 101 with greater level of energy consumption may have a higher dominance score than a sector 101 with a lower level of energy consumption. In some embodiments, one or more other factors (e.g., attributes of sectors 101, such as attributes of sector models 201 associated with such sectors 101) may be used in determining a dominance score for a given sector 101.

In some embodiments, active frequency bands and/or RATs may be a factor based on which a dominance score for a particular sector 101 may be determined. For example, a sector 101 that is operating at a particular set of frequency bands or a particular RAT (e.g., a 5G RAT) may have a higher dominance score than a sector 101 that is operating at a different set of frequency bands and/or a different RAT (e.g., a LTE RAT).

In some embodiments, GOS 105 may select (at 704) sector 101-2 to perform one or more actions to remediate the detected interference. For example, GOS 105 may have determined that a dominance score for sector 101-2 is lower than a dominance score for sector 101-1. In some embodiments, a sector with a higher dominance score may be selected to implement one or more remedial actions.

As further shown in FIG. 7A, GOS 105 may instruct (at 706) sector 101-2 to perform the selected remedial actions, and sector 101-2 may proceed to implement (at 708) instructed remedial actions. In some embodiments, some or all of operations 702-708 may repeat iteratively, such that the result of the implemented actions may be evaluated by GOS 105 based on continued monitoring (e.g., at 702) of RF metrics after the implementation (at 708) of the actions, and up-to-date interference models and/or associated actions may be determined (at 704).

As another example, GOS 105 may determine that actual measured interference at sector 101-1 (based on RF metrics received at 702) is greater than an expected level of interference (e.g., based on historical interference metrics and/or based on one or more sector models 201, as discussed above). GOS 105 may further determine that a transmit power associated with one or more base stations 103 of sector 101-2 is higher than an expected transmit power, higher than a configured transmit power, and/or is otherwise higher than a previously used transmit power. In this situation, GOS 105 may determine that the interference exhibited at sector 101-1 may have been caused by the increased transmit power at sector 101-2. In this situation, GOS 105 may determine that the transmit power of one or more base stations 103 of sector 101-1 should be reduced, so as not to collide with or otherwise interfere with RF signals from sector 101-2 (e.g., the RF signals from sector 101-2 that are transmitted based on the increased transmit power at sector 101-2). Alternatively, in some embodiments, GOS 105 may determine that the transmit power of one or more base stations 103 of sector 101-2 should be reduced, as the increase in transmit power at sector 101-2 caused interference at sector 101-1. In some embodiments, GOS 105 may modify the transmission powers at both sectors 101, may cause a coordinated multi-point configuration of sectors 101-1 and 101-2 to be implemented (e.g., where base stations 103 of both sectors 101-1 and 101-2 coordinate on the frequency and/or timing of transmissions to avoid collisions), and/or may otherwise cause both sectors 101-1 and 101-2 to perform actions to remediate the interference between sectors 101-1 and 101-2.

For example, as shown in FIG. 7B, GOS 105 may receive (at 702) RF metrics from sectors 101-1 and 101-2, determine (at 710) RF interference associated with sectors sector 101-1 and 101-2, and may select both sectors to perform remedial actions. GOS 105 may accordingly instruct (at 712) sectors 101-1 and 101-2 to perform the selected remedial actions, and sectors 101-1 and 101-2 may perform (at 714 and 716, respectively) the instructed remedial actions. For example, GOS 105 may instruct sectors 101-1 and 101-2 to modify (e.g., reduce) a transmit power of reference signals and/or other RF signals, modify beamforming parameters of sectors 101-1 and/or 101-2 such that RF signals from these sectors are not pointed at one another (and/or are less strongly directed at one another), implement a coordinated multi-point configuration, modify PRBs used for reference signals, and/or perform other remedial actions. In some embodiments, sectors 101-1 and 101-2 may be instructed to perform the same remedial actions or different remedial actions.

As another example, as shown in FIG. 7C, GOS 105 may receive (at 702) RF metrics from sectors 101-1, 101-2, and 101-3, and determine (at 718) RF interference associated with sectors sector 101-1, 101-2, and 101-3. In this example, further assume that GOS 105 determines that sector 101-3 has a highest dominance score out of sectors 101-1, 101-2, and 101-3. In accordance with some embodiments, GOS 105 may select (at 718) one or more remedial actions for sector 101-1 and 101-2 to perform, while forgoing selecting actions for sector 101-3 to perform, based on sector 101-3 having the highest dominance score of these sectors. GOS 105 may accordingly instruct (at 720) sectors 101-1 and 101-2 to perform the selected remedial actions, and sectors 101-1 and 101-2 may perform (at 722 and 724, respectively) the instructed remedial actions.

Figure 8:
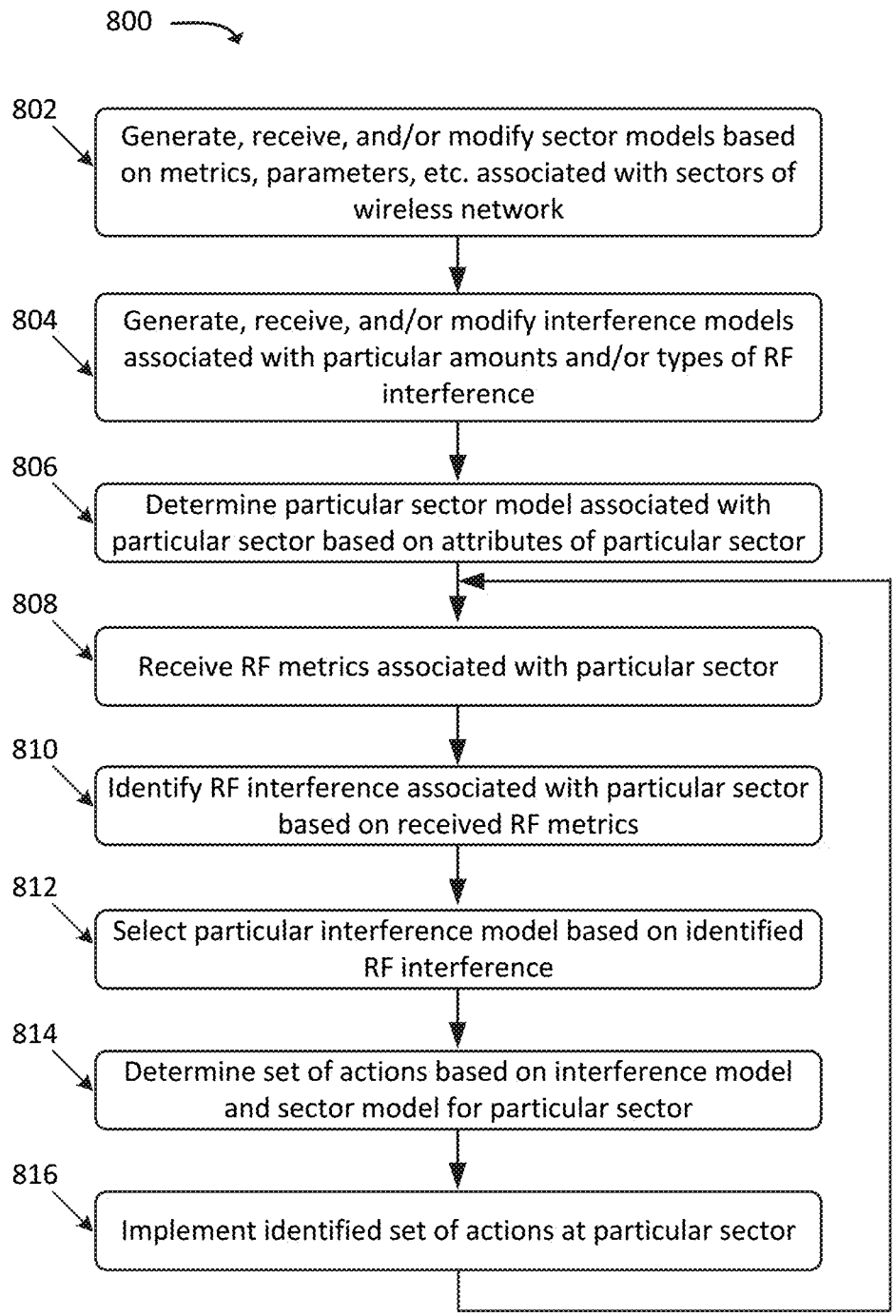
FIG. 8 illustrates an example process for determining one or more sector models, interference models, and/or sets of actions to perform with respect to a given sector associated with a RAN of a wireless network, in accordance with some embodiments.

FIG. 8 illustrates an example process 800 for determining one or more sector models, interference models, and/or sets of actions to perform with respect to a given sector associated with a RAN of a wireless network. In some embodiments, some or all of process 800 may be performed by GOS 105. In some embodiments, one or more other devices may perform some or all of process 800 in concert with, and/or in lieu of, GOS 105, such as one or more devices or systems associated with one or more sectors 101.

As shown, process 800 may include generating, receiving, and/or modifying (at 802) one or more sector models 201 based on metrics, parameters, etc. associated with one or more sectors 101 of a wireless network. For example, as discussed above, GOS 105 may use AI/ML techniques or other suitable techniques to generate and/or refine sector models 201. For example, GOS 105 may evaluate metrics based on real-word and/or simulated KPIs and/or attributes of one or more sectors 101 in order to generate one or more clusters, classifications, or the like, which may be reflected by sector models 201.

Process 800 may further include generating, receiving, and/or modifying (at 804) one or more interference models associated with particular amounts and/or types of RF interference. For example, as discussed above, GOS 105 may evaluate measures of RF interference (e.g., including or based on RSSI values, SINR values, RSRP values, and/or other suitable measures of interference), types of RF interference (e.g., the detection of colliding RF signals from multiple sources such as multiple base stations 103, the detection of reference signals from multiple sources, the detection of a difference in actual interference as compared to expected interference, and/or other types of RF interference). Such channel RF interference metrics may be received from UEs 501 connected to one or more base stations 103 (e.g., real-world measured or computed metrics), from one or more base stations 103 and/or other wireless network infrastructure elements, and/or may be generated or received based on a simulation of a RAN (e.g., in which channel conditions between one or more UEs 501 and one or more base stations 103 are simulated).

Process 800 may additionally include determining (at 806) a particular sector model associated with a particular sector 101 of a RAN based on attributes of the particular sector 101. For example, as discussed above, GOS 105 may receive information associated with sector 101, such as RF metrics 301, QoS metrics 303, energy consumption metrics 305, RAN configuration parameters 307, inter-sector information 309, locale features 311, and/or other suitable information, which GOS 105 may compare to attributes of one or more sector models 201, in order to determine one or more particular sector models 201 associated with sector 101. For example, as discussed above, GOS 105 may use one or more AI/ML techniques to determine an association, correlation, or the like between the attributes associated with sector 101 and one or more sector models 201. For example, GOS 105 may select a particular sector model 201 from a set of candidate sector models 201, and/or may generate a new sector model 201 based on the attributes of sector 101.

Process 800 may also include receiving (at 808) RF metrics associated with the particular sector 101. For example, GOS 105 may monitor, receive, etc. reference metrics associated with the particular sector 101. In some embodiments, as discussed above, the RF metrics may include, and/or may be based on, measurement reports generated by one or more UEs 501 located in and/or connected to one or more base stations 103 associated with sector 101. In some embodiments, the RF metrics may be generated by one or more base stations 103 and/or other devices or systems located in or serving sector 101.

Process 800 may further include identifying (at 810) RF interference within sector 101 based on the received RF metrics. For example, GOS 105 may determine, based on the RF metrics, that measures of RF interference exceed threshold levels, that measures of RF interference differ from historical RF interference levels, that colliding RF signals (e.g., from multiple sources) have been detected within sector 101, and/or that other types of RF interference have been detected.

Process 800 may additionally include selecting (at 812) a particular interference model 203 based on the identified RF interference. For example, GOS 105 may use a suitable correlation, similarity, etc. analysis to identify one or more interference models 203, out of a set of candidate interference models 203, that match (e.g., within a threshold level of similarity) the type and/or amount of identified RF interference within sector 101.

Process 800 may also include determining (at 814) a set of actions based on the selected interference model 203 and sector model 201. For example, as discussed above, GOS 105 may use AI/ML techniques or other suitable techniques to identify a particular set of actions associated with the selected interference model 203 and sector model 201. For example, as discussed above, GOS 105 may maintain or determine one or more affinity scores or other suitable scores between sets of actions 205, interference models 203, and/or sector models 201, based on which a particular set of actions 205 may be selected.

Process 800 may further include implementing (at 816) the identified set of actions. For example, as discussed above, sector 101 may make one or more adjustments to parameters (e.g., frequency bands and/or timing offsets used for particular RF signals such as reference signals), physical devices (e.g., antennas), or the like based on the identified set of actions/parameters 205.

As shown in FIG. 8, some or all of process 800 may be performed and/or repeated iteratively. For example, some or all of operations 808-816 may be repeated and/or performed, in order to continuously remediate potential RF interference within a given sector 101. That is, the results of implementing (at 816) particular actions in response to particular interference models 203 associated with particular sector models 201 may be evaluated (e.g., based on continued monitoring (at 808)). Further, the associations or affinity scores between sector models 201, interference models 203, and sets of actions/parameters 205 may be modified (e.g., strengthened or weakened) based on whether particular actions 205 improved interference within sector 101 and/or surrounding sectors 101. For example, if a particular action 205 reduced RF interference (e.g., reduced compared to a previous level of RF interference, and/or reduced RF interference below a threshold level), an affinity score between particular action 205 and an appropriate sector model 201 and/or interference model 203 for sector 101 may be increased. If, on the other hand, a particular action 205 increased and/or did not affect RF interference (e.g., did not reduce RF interference compared to a previous level of RF interference, and/or did not reduce RF interference below a threshold level), an affinity score between particular action 205 and an appropriate sector model 201 and/or interference model 203 for sector 101 may be decreased, thus reducing or eliminating the likelihood that the same action 205 is selected in future instances of similar types of RF interference detected at sectors having similar attributes as particular sector 101.

Figure 9:
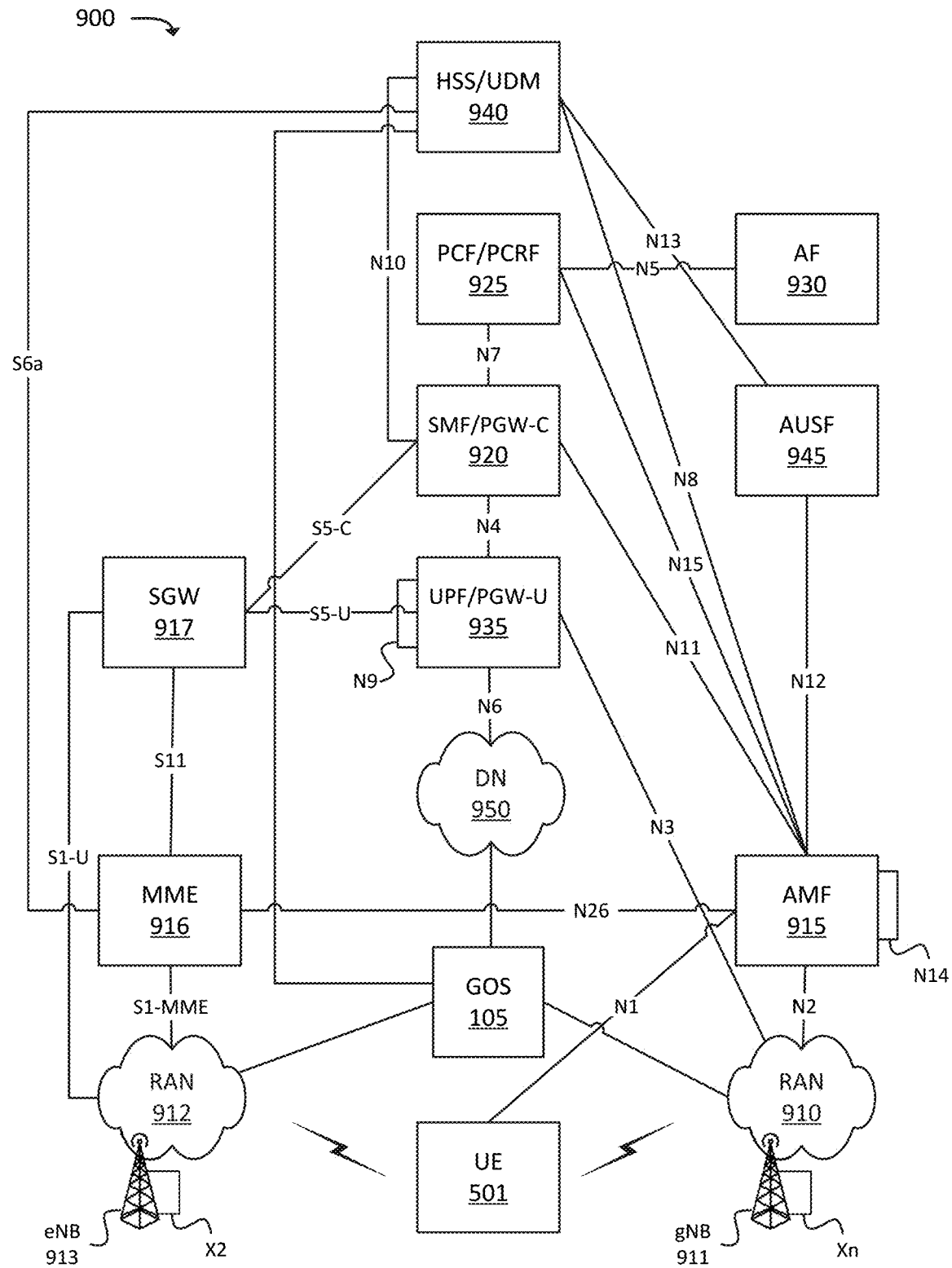
FIG. 9 illustrates an example environment in which one or more embodiments, described herein, may be implemented.

FIG. 9 illustrates an example environment 900, in which one or more embodiments may be implemented. In some embodiments, environment 900 may correspond to a 5G network, and/or may include elements of a 5G network. In some embodiments, environment 900 may correspond to a 5G Non-Standalone ("NSA") architecture, in which a 5G RAT may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). As shown, environment 900 may include UE 501, RAN 910 (which may include one or more Next Generation Node Bs ("gNBs") 911), RAN 912 (which may include one or more one or more evolved Node Bs ("eNBs") 913), and various network functions such as Access and Mobility Management Function ("AMF") 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW- User plane function ("PGW-U") 935, Home Subscriber Server ("HSS")/Unified Data Management ("UDM") 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950), such as GOS 105.

The example shown in FIG. 9 illustrates one instance of each network component or function (e.g., one instance of SMF/PGW-C 920, PCF/PCRF 925, UPF/PGW-U 935, HSS/UDM 940, and/or 945). In practice, environment 900 may include multiple instances of such components or functions. For example, in some embodiments, environment 900 may include multiple "slices" of a core network, where each slice includes a discrete set of network functions (e.g., one slice may include a first instance of SMF/PGW-C 920, PCF/PCRF 925, UPF/PGW-U 935, HSS/UDM 940, and/or 945, while another slice may include a second instance of SMF/PGW-C 920, PCF/PCRF 925, UPF/PGW-U 935, HSS/UDM 940, and/or 945). The different slices may provide differentiated levels of service, such as service in accordance with different QoS parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 501 may include a computation and communication device, such as a wireless mobile communication device that is capable of communicating with RAN 910, RAN 912, and/or DN 950. UE 501 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 501 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 501 may communicate with one or more other elements of environment 900. UE 501 may communicate with RAN 910 via an air interface (e.g., as provided by gNB 911). For instance, RAN 910 may receive traffic (e.g., voice call traffic, data traffic, messaging traffic, signaling traffic, etc.) from UE 501 via the air interface, and may communicate the traffic to UPF/PGW-U 935, and/or one or more other devices or networks. Similarly, RAN 910 may receive traffic intended for UE 501 (e.g., from UPF/PGW-U 935, AMF 915, and/or one or more other devices or networks) and may communicate the traffic to UE 501 via the air interface. In some embodiments, base station 103 may be, may include, and/or may be implemented by one or more gNBs 911.

RAN 912 may be, or may include, a LTE RAN that includes one or more base stations (e.g., one or more eNBs 913), via which UE 501 may communicate with one or more other elements of environment 900. UE 501 may communicate with RAN 912 via an air interface (e.g., as provided by eNB 913). For instance, RAN 910 may receive traffic (e.g., voice call traffic, data traffic, messaging traffic, signaling traffic, etc.) from UE 501 via the air interface, and may communicate the traffic to UPF/PGW-U 935, and/or one or more other devices or networks. Similarly, RAN 910 may receive traffic intended for UE 501 (e.g., from UPF/PGW-U 935, SGW 917, and/or one or more other devices or networks) and may communicate the traffic to UE 501 via the air interface. In some embodiments, base station 103 may be, may include, and/or may be implemented by one or more eNBs 913.

AMF 915 may include one or more devices, systems, Virtualized Network Functions ("VNFs"), etc., that perform operations to register UE 501 with the 5G network, to establish bearer channels associated with a session with UE 501, to hand off UE 501 from the 5G network to another network, to hand off UE 501 from the other network to the 5G network, manage mobility of UE 501 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, etc., that perform operations to register UE 501 with the EPC, to establish bearer channels associated with a session with UE 501, to hand off UE 501 from the EPC to another network, to hand off UE 501 from another network to the EPC, manage mobility of UE 501 between RANs 912 and/or eNBs 913, and/or to perform other operations.

SGW 917 may include one or more devices, systems, VNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, etc., that gather, process, store, and/or provide information in a manner described herein. SMF/PGW-C 920 may, for example, facilitate in the establishment of communication sessions on behalf of UE 501. In some embodiments, the establishment of communications sessions may be performed in accordance with one or more policies provided by PCF/PCRF 925.

PCF/PCRF 925 may include one or more devices, systems, VNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, etc., that receive, store, and/or provide information that may be used in determining parameters (e.g., quality of service parameters, charging parameters, or the like) for certain applications.

UPF/PGW-U 935 may include one or more devices, systems, VNFs, etc., that receive, store, and/or provide data (e.g., user plane data). For example, UPF/PGW-U 935 may receive user plane data (e.g., voice call traffic, data traffic, etc.), destined for UE 501, from DN 950, and may forward the user plane data toward ULE 501 (e.g., via RAN 910, SMF/PGW-C 920, and/or one or more other devices). In some embodiments, multiple UPFs 935 may be deployed (e.g., in different geographical locations), and the delivery of content to UE 501 may be coordinated via the N9 interface (e.g., as denoted in FIG. 9 by the line marked "N9" originating and terminating at UPF/PGW-U 935). Similarly, UPF/PGW-U 935 may receive traffic from UE 501 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 501.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 501 may communicate, through DN 950, with data servers, other UEs 501, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 501 may communicate.

GOS 105 may include one or more devices, systems, VNFs, etc. that perform one or more operations described above. For example, GOS 105 may generate and/or maintain sector models 201, interference models 203, and/or sets of actions and/or parameters 205. Further GOS 105 may determine associations between respective sector models 201, interference models 203, and/or sets of actions and/or parameters 205. GOS 105 may identify particular sectors 101 to be remediated, improved, etc., and may identify sector models 201, interference models 203, and/or actions 205 to perform with respect to such sectors 101, as described above. GOS 105 may communicate with gNBs 911 and/or eNBs 913 via an X2 interface, may receive UE information and/or other network information from HSS/UDM 940 via a suitable API or other communication pathway, and/or may communicate with UEs 501 via gNBs 911 and/or eNBs 913.

Figure 10:
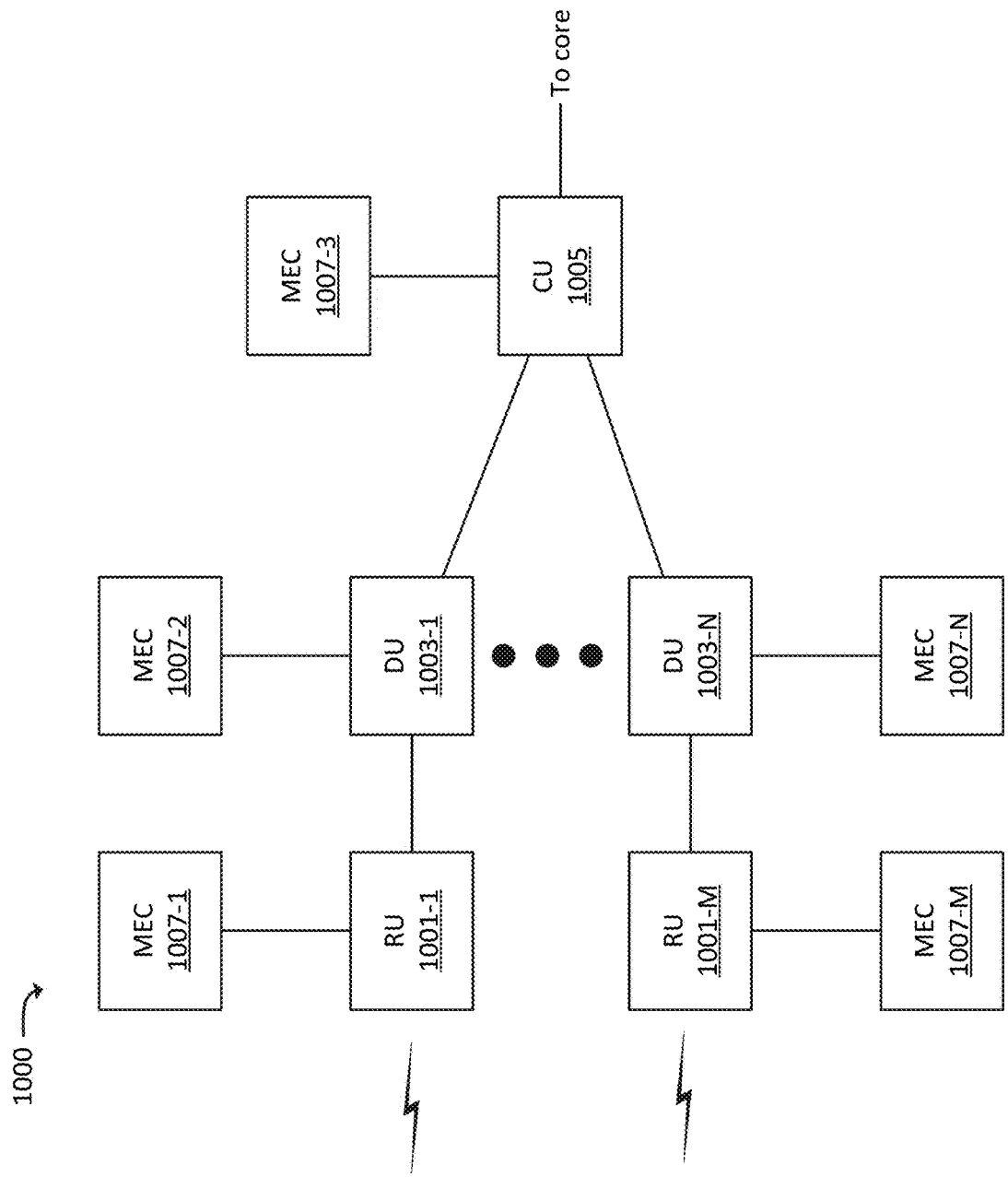
FIG. 10 illustrates an example arrangement of a radio access network ("RAN"), in accordance with some embodiments.

FIG. 10 illustrates an example Distributed Unit ("DU") network 1000, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 501 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 501, and may determine which DU(s) 1003 should receive the downlink traffic. DU 1003 may include one or more devices that transmit traffic between a core network (e.g., via CU 1005) and UE 501 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 501.

RU 1001 may include hardware circuitry (e.g., one or more RF transceivers, antennas, radios, and/or other suitable hardware) to communicate wirelessly (e.g., via an RF interface) with one or more UEs 501, one or more other DUs 1003 (e.g., via RUs 1001 associated with DUs 1003), and/or any other suitable type of device. In the uplink direction, RU 1001 may receive traffic from UE 501 and/or another DU 1003 via the RF interface and may provide the traffic to DU 1003. In the downlink direction, RU 1001 may receive traffic from DU 1003, and may provide the traffic to UE 501 and/or another DU 1003.

RUs 1001 may, in some embodiments, be communicatively coupled to one or more Multi-Access/Mobile Edge Computing ("MEC") devices, referred to sometimes herein simply as ("MECs") 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 501, via a respective RU 1001.

For example, RU 1001-1 may route some traffic, from UE 501, to MEC 1007-1 instead of to a core network (e.g., via DU 1003 and CU 1005). MEC 1007-1 may process the traffic, perform one or more computations based on the received traffic, and may provide traffic to UE 501 via RU 1001-1. In this manner, ultra-low latency services may be provided to UE 501, as traffic does not need to traverse DU 1003, CU 1005, and an intervening backhaul network between DU network 1000 and the core network. In some embodiments, MEC 1007 may include, and/or may implement, some or all of the functionality described above with respect to GOS 105.

Figure 11:
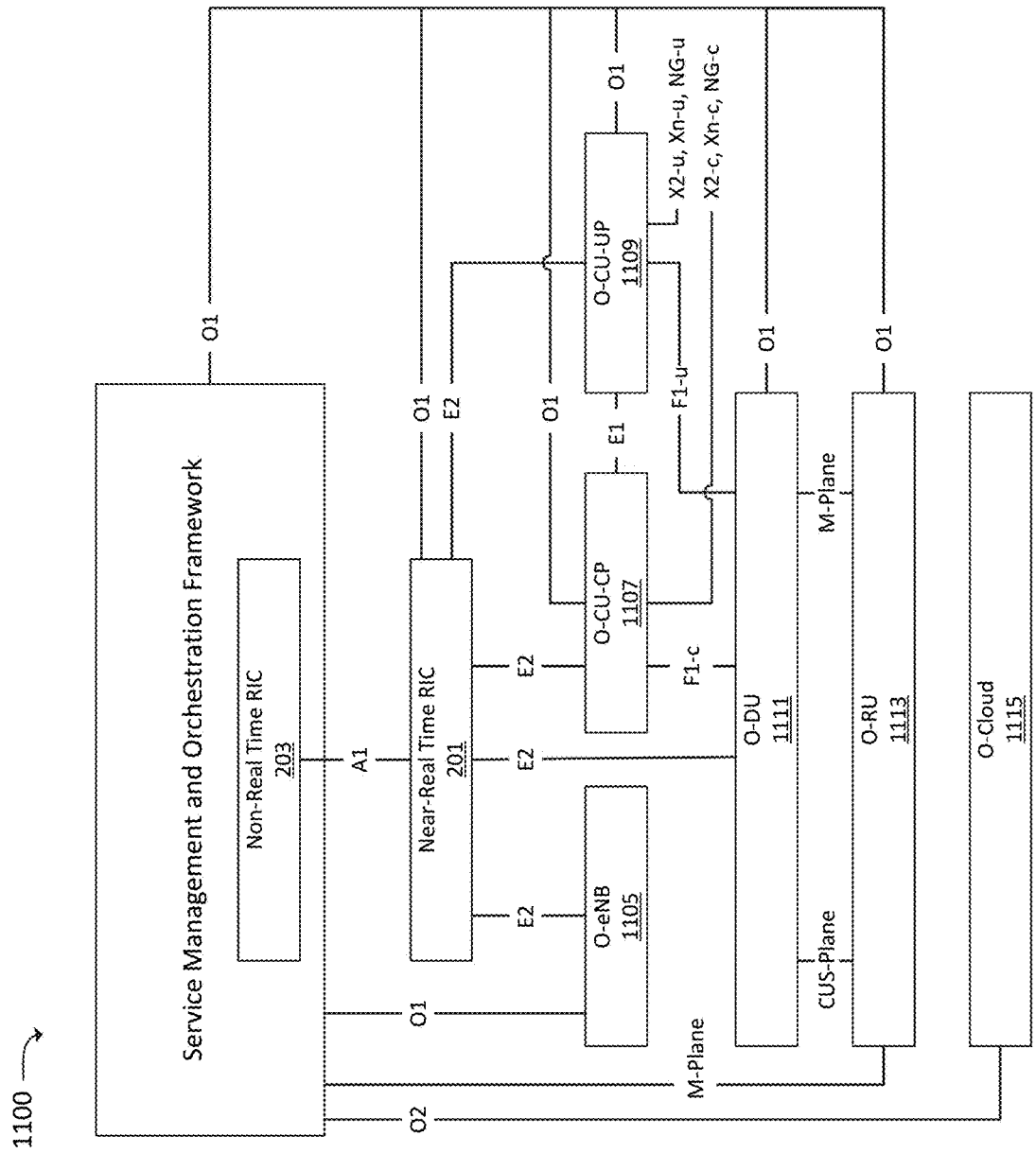
FIG. 11 illustrates an example arrangement of an Open RAN ("O-RAN") environment in which one or more embodiments, described herein, may be implemented.

FIG. 11 illustrates an example O-RAN environment 1100, which may correspond to RAN 910, RAN 912, and/or DU network 1000. For example, RAN 910, RAN 912, and/or DU network 1000 may include one or more instances of O-RAN environment 1100, and/or one or more instances of O-RAN environment 1100 may implement RAN 910, RAN 912, DU network 1000, and/or some portion thereof. As shown, O-RAN environment 1100 may include Non-Real Time Radio Intelligent Controller ("RIC") 1101, Near-Real Time RIC 1103, O-eNB 1105, O-CU-Control Plane ("O-CU-CP") 1107, O-CU-User Plane ("O-CU-UP") 1109, O-DU 1111, O-RU 1113, and O-Cloud 1115. In some embodiments, O-RAN environment 1100 may include additional, fewer, different, and/or differently arranged components.

In some embodiments, some or all of the elements of O-RAN environment 1100 may be implemented by one or more configurable or provisionable resources, such as virtual machines, cloud computing systems, physical servers, and/or other types of configurable or provisionable resources. In some embodiments, some or all of O-RAN environment 1100 may be implemented by, and/or communicatively coupled to, one or more MECs 1007.

Non-Real Time RIC 1101 and Near-Real Time RIC 1103 may receive performance information (and/or other types of information) from one or more sources, and may configure other elements of O-RAN environment 1100 based on such performance or other information. For example, Near-Real Time RIC 1103 may receive performance information, via one or more E2 interfaces, from O-eNB 1105, O-CU-CP 1107, and/or O-CU-UP 1109, and may modify parameters associated with O-eNB 1105, O-CU-CP 1107, and/or O-CU-UP 1109 based on such performance information. Similarly, Non-Real Time RIC 1101 may receive performance information associated with O-eNB 1105, O-CU-CP 1107, O-CU-UP 1109, and/or one or more other elements of O-RAN environment 1100 and may utilize machine learning and/or other higher level computing or processing to determine modifications to the configuration of O-eNB 1105, O-CU-CP 1107, O-CU-UP 1109, and/or other elements of O-RAN environment 1100. In some embodiments, Non-Real Time RIC 1101 may generate machine learning models based on performance information associated with O-RAN environment 1100 or other sources, and may provide such models to Near-Real Time RIC 1103 for implementation.

O-eNB 1105 may perform functions similar to those described above with respect to eNB 913. For example, O-eNB 1105 may facilitate wireless communications between UE 501 and a core network. O-CU-CP 1107 may perform control plane signaling to coordinate the aggregation and/or distribution of traffic via one or more DUs 1003, which may include and/or be implemented by one or more O-DUs 1111, and O-CU-UP 1109 may perform the aggregation and/or distribution of traffic via such DUs 1003 (e.g., O-DUs 1111). O-DU 1111 may be communicatively coupled to one or more RUs 1001, which may include and/or may be implemented by one or more O-RUs 1113. In some embodiments, O-Cloud 1115 may include or be implemented by one or more MECs 1007, which may provide services, and may be communicatively coupled, to O-CU-CP 1107, O-CU-UP 1109, O-DU 1111, and/or O-RU 1113 (e.g., via an O1 and/or O2 interface).

Figure 12:
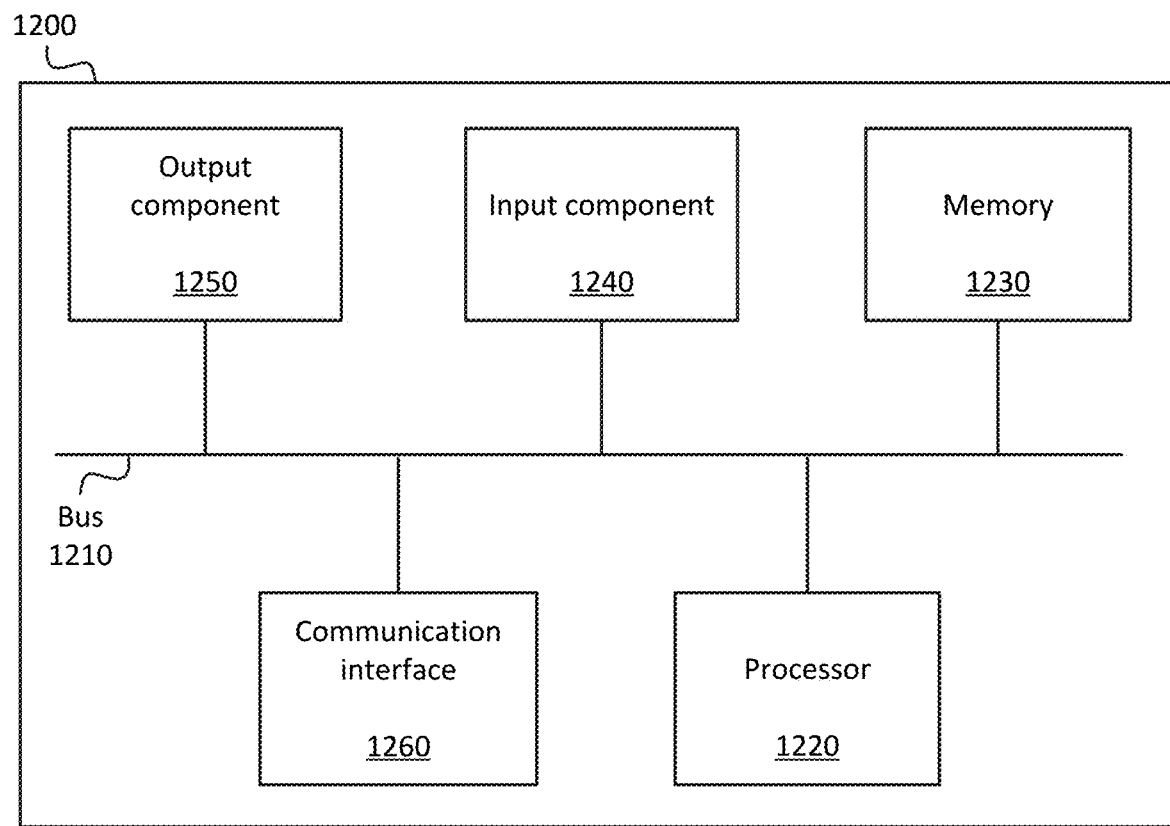
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth© radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
generate a plurality of sector models, wherein each sector model, of the plurality of sector models, is associated with a respective set of radio access network ("RAN") attributes;
generate a plurality of interference models, wherein each interference model, of the plurality of interference models, includes a set of interference metrics;
receive radio frequency ("RF") metrics associated with a RAN having wireless network infrastructure that provides wireless service within a particular sector;
identify attributes of the particular sector;
select a particular sector model, from the plurality of sector models, based on a comparison of the identified attributes of the particular sector to attributes of the plurality of sector models;
identify RF interference within the particular sector based on the received RF metrics associated with the particular sector;
select a particular interference model, of the plurality of interference models, based on a comparison of the identified RF interference within the particular sector to interference metrics of the plurality of interference models;
determine a particular set of actions based on the selected particular sector model and the particular interference model; and
implement the determined set of actions at the wireless network infrastructure of the particular sector.

2. The device of claim 1, wherein the particular sector is a first sector, wherein the one or more processors are further configured to:
identify RF interference within a second sector concurrently with the RF interference identified within the first sector;
select, based on attributes of the first sector and the second sector, the first sector to implement the determined set of actions.

3. The device of claim 2, wherein selecting the first sector includes forgoing implementing one or more actions, based on the identified RF interference within the second sector, at wireless network infrastructure of the second sector.

4. The device of claim 1, wherein the RF metrics include information based on one or more measurement reports generated by one or more User Equipment ("UEs") located within the particular sector.

5. The device of claim 4, wherein at least a particular measurement report, of the one or more measurement reports, indicates:
- a detection of RF signals from the wireless network infrastructure of the particular sector, and
- a concurrent detection of RF signals from wireless network infrastructure of a different sector.

6. The device of claim 5, wherein the RF signals detected from the wireless network infrastructure of the particular sector and the wireless network infrastructure of the different sector include:
- first RF signals, according to a particular set of frequencies, from the wireless network infrastructure of the particular sector, and
- second RF signals, according to the same particular set of frequencies, from the wireless network infrastructure of the different sector.

7. The device of claim 1, wherein selecting the particular interference model includes:
- determining historical RF interference within the particular sector based on past RF metrics associated with the particular sector;
- comparing the historical RF interference to the RF interference determined based on the received RF metrics associated with the particular sector;
- determining, based on the comparing, a difference between the historical RF interference and the RF interference determined based on the received RF metrics associated with the particular sector; and
- selecting the particular interference model based on the determined difference between the historical RF interference and the RF interference determined based on the received RF metrics associated with the particular sector.

8. A non-transitory computer-readable medium, storing a plurality of processor-executable instructions to:
- generate a plurality of sector models, wherein each sector model, of the plurality of sector models, is associated with a respective set of radio access network ("RAN") attributes;
- generate a plurality of interference models, wherein each interference model, of the plurality of interference models, includes a set of interference metrics;
- receive radio frequency ("RF") metrics associated with a RAN having wireless network infrastructure that provides wireless service within a particular sector;
- identify attributes of the particular sector;
- select a particular sector model, from the plurality of sector models, based on a comparison of the identified attributes of the particular sector to attributes of the plurality of sector models;
- identify RF interference within the particular sector based on the received RF metrics associated with the particular sector;
- select a particular interference model, of the plurality of interference models, based on a comparison of the identified RF interference within the particular sector to interference metrics of the plurality of interference models;
- determine a particular set of actions based on the selected particular sector model and the particular interference model; and
- implement the determined set of actions at the wireless network infrastructure of the particular sector.

9. The non-transitory computer-readable medium of claim 8, wherein the particular sector is a first sector, wherein the plurality of processor-executable instructions further include processor-executable instructions to:
- identify RF interference within a second sector concurrently with the RF interference identified within the first sector;
- select, based on attributes of the first sector and the second sector, the first sector to implement the determined set of actions.

10. The non-transitory computer-readable medium of claim 9, wherein selecting the first sector includes forgoing implementing one or more actions, based on the identified RF interference within the second sector, at wireless network infrastructure of the second sector.

11. The non-transitory computer-readable medium of claim 8, wherein the RF metrics include information based on one or more measurement reports generated by one or more User Equipment ("UEs") located within the particular sector.

12. The non-transitory computer-readable medium of claim 11, wherein at least a particular measurement report, of the one or more measurement reports, indicates:
- a detection of RF signals from the wireless network infrastructure of the particular sector, and
- a concurrent detection of RF signals from wireless network infrastructure of a different sector.

13. The non-transitory computer-readable medium of claim 12, wherein the RF signals detected from the wireless network infrastructure of the particular sector and the wireless network infrastructure of the different sector include:
- first RF signals, according to a particular set of frequencies, from the wireless network infrastructure of the particular sector, and
- second RF signals, according to the same particular set of frequencies, from the wireless network infrastructure of the different sector.

14. The non-transitory computer-readable medium of claim 8, wherein selecting the particular interference model includes:
- determining historical RF interference within the particular sector based on past RF metrics associated with the particular sector;
- comparing the historical RF interference to the RF interference determined based on the received RF metrics associated with the particular sector;
- determining, based on the comparing, a difference between the historical RF interference and the RF interference determined based on the received RF metrics associated with the particular sector; and
- selecting the particular interference model based on the determined difference between the historical RF interference and the RF interference determined based on the received RF metrics associated with the particular sector.

15. A method, comprising:
- generating a plurality of sector models, wherein each sector model, of the plurality of sector models, is associated with a respective set of radio access network ("RAN") attributes;
- generating a plurality of interference models, wherein each interference model, of the plurality of interference models, includes a set of interference metrics;
- receiving radio frequency ("RF") metrics associated with a RAN having wireless network infrastructure that provides wireless service within a particular sector;
- identifying attributes of the particular sector;

selecting a particular sector model, from the plurality of sector models, based on a comparison of the identified attributes of the particular sector to attributes of the plurality of sector models;

identifying RF interference within the particular sector based on the received RF metrics associated with the particular sector;

selecting a particular interference model, of the plurality of interference models, based on a comparison of the identified RF interference within the particular sector to interference metrics of the plurality of interference models;

determining a particular set of actions based on the selected particular sector model and the particular interference model; and implementing the determined set of actions at the wireless network infrastructure of the particular sector.

16. The method of claim 15, wherein the particular sector is a first sector, the method further comprising:

identifying RF interference within a second sector concurrently with the RF interference identified within the first sector;

selecting, based on attributes of the first sector and the second sector, the first sector to implement the determined set of actions without implementing one or more actions, based on the identified RF interference within the second sector, at wireless network infrastructure of the second sector.

17. The method of claim 15, wherein the RF metrics include information based on one or more measurement reports generated by one or more User Equipment ("UEs") located within the particular sector.

18. The method of claim 17, wherein at least a particular measurement report, of the one or more measurement reports, indicates:

a detection of RF signals from the wireless network infrastructure of the particular sector, and a concurrent detection of RF signals from wireless network infrastructure of a different sector.

19. The method of claim 18, wherein the RF signals detected from the wireless network infrastructure of the particular sector and the wireless network infrastructure of the different sector include:

first RF signals, according to a particular set of frequencies, from the wireless network infrastructure of the particular sector, and second RF signals, according to the same particular set of frequencies, from the wireless network infrastructure of the different sector.

20. The method of claim 15, wherein selecting the particular interference model includes:

determining historical RF interference within the particular sector based on past RF metrics associated with the particular sector;

comparing the historical RF interference to the RF interference determined based on the received RF metrics associated with the particular sector;

determining, based on the comparing, a difference between the historical RF interference and the RF interference determined based on the received RF metrics associated with the particular sector; and selecting the particular interference model based on the determined difference between the historical RF interference and the RF interference determined based on the received RF metrics associated with the particular sector.

* * * * *